US006331500B1

(12) United States Patent
Tsuji et al.

(10) Patent No.: US 6,331,500 B1
(45) Date of Patent: Dec. 18, 2001

(54) FUNCTIONALIZED MOLECULAR SIEVES

(75) Inventors: Katsuyuki Tsuji; Christopher W. Jones; Mark E. Davis, all of Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/127,543

(22) Filed: Jul. 31, 1998

Related U.S. Application Data

(60) Provisional application No. 60/057,652, filed on Aug. 25, 1997, and provisional application No. 60/083,787, filed on May 1, 1998.

(51) Int. Cl.[7] .................................................... B01J 29/06

(52) U.S. Cl. ............................... 502/63; 502/60; 502/62; 502/64; 502/71; 502/77; 502/79; 502/85; 423/701; 423/705; 423/708; 423/DIG. 21; 423/DIG. 22; 423/DIG. 27

(58) Field of Search ................................. 423/701, 705, 423/708, DIG. 21, DIG. 22, DIG. 27; 502/60, 62, 63, 64, 71, 77, 79, 85

(56) References Cited

U.S. PATENT DOCUMENTS

| | | | |
|---|---|---|---|
| 5,102,955 | 4/1992 | Calabro et al. | 525/240 |
| 5,110,572 | 5/1992 | Calabro et al. | 423/328 |
| 5,145,816 | 9/1992 | Beck et al. | 502/60 |
| 5,194,410 | 3/1993 | Calabro | 502/62 |
| 5,200,058 | 4/1993 | Beck et al. | 208/46 |
| 5,220,101 | 6/1993 | Beck et al. | 585/824 |
| 5,227,151 | 7/1993 | Calabro | 423/703 |
| 5,279,810 | 1/1994 | Calabro | 423/701 |
| 5,308,602 | 5/1994 | Calabro et al. | 423/705 |
| 5,552,357 * | 9/1996 | Lago et al. | 502/63 |
| 5,675,047 * | 10/1997 | Beck et al. | 585/467 |
| 5,726,114 * | 3/1998 | Chang et al. | 502/64 |
| 5,942,207 * | 8/1999 | Moini et al. | 423/700 |
| 5,948,383 * | 9/1999 | Kuznicki et al. | 423/700 |

FOREIGN PATENT DOCUMENTS

| | | | |
|---|---|---|---|
| 0123060 | 10/1984 | (EP) | C01B/33/18 |
| 0739856A | 10/1996 | (EP) | C01B/37/02 |
| WO97/46743 * | 12/1997 | (WO) . | |

OTHER PUBLICATIONS

Patent Abstracts of Japan, vol. 013, No. 549 (C–662), Dec. 7, 1989 & JP 01 226713 A (JGC Corp), Sep. 11, 1989.
Cauvel, et al., "Functionalization of Y Zeolites with Organosilane Reagents", *Studies in Surface Science and Catalysis* 94, pp. 286–94 (1995).
Corma, et al., "New Rhodium Complexes Anchored on Modified USY Zeolites. A Remarkable Effect of the Support on the Enantioselectivity of Catalytic Hydrogenation of Prochiral Alkenes", *J. Chem. Soc., Chem. Commun.*, pp. 1253–55 (1991).

Sánchez, et al., "New Rhodium Anchored on Silica and Modified Y–Zeolite as Efficient Catalysts for Hydrogenation of Olefins", *J. Molecular Catalysis* 70, pp. 369–79 (1991).
Corma, et al., "Conjugate Addition of Diethylzinc to Enones Catalyzed by Homogeneous and Supported Chiral Ni–Complexes. Cooperative Effect of the Support on Enantioselectivity", *Tetrahedron: Asymmetry* 3 (7), pp. 845–48 (1992).
Carmona, et al., "Synthesis and Characterization of new Chiral Rh (I) Complexes with N,N'–, and N,P–ligands. A Study of Anchoring on the Modified Zeolites and Catalytic Properties of Heterogenized Complexes", *J. Org. Chem.* 492, pp. 11–21 (1995).
Maeda, et al., "Synthesis of the First Microporous Aluminum Phosphonate with Organic Groups Covalently Bonded to the Skeleton", *Angew. Chem. Int. Ed. Engl.* 33 (22), pp. 2335–37 (1994).

(List continued on next page.)

*Primary Examiner*—Steven P. Griffin
*Assistant Examiner*—Christina Ildebrando
(74) *Attorney, Agent, or Firm*—Pillsbury Madison & Sutro LLP; W. Patrick Bengtsson; Tanuja V. Garde

(57) ABSTRACT

The present invention relates to functionalized molecular sieves that are useful as shape-selective adsorbents and catalysts. The inventive molecular sieves have a crystalline framework and include micropores of substantially uniform size and shape formed therein. These micropores contain one or more accessible organic moieties that are linked to the crystalline framework by a carbon-silicon ond. Shape selectivity of the inventive molecular sieves may be modulated by varying the size and shape of the micropores (which is a function of the particular molecular sieve being synthesized) and the organic moiety incoporated therein. In preferred embodiments, the molecular sieves of the present invention include crosslinked monomers of the formula

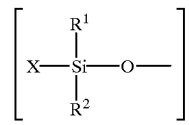

wherein:

X is a subsituted or unsubstituted moiety and
$R^1$ and $R^2$ are each independently either oxygen, or a substituted or unsubstituted moiey, wherein the moiety is selected from the group consisting of $C_1$–$C_{20}$ alkyl, $C_2$–$C_{10}$ alkenyl, $C_2$–$C_{20}$ alkynyl, cycloalkyl, cycloalkenyl, aryl, and heteroaryl, each optionally substituted with one or more substituents elected from the group consisting of $C_1$–$C_5$ alkyl, $C_2$–$C_5$ alkenyl, $C_2$–$C_5$ alkynyl, cycloalkyl, cycloalkenyl, aryl, heteroaryl, and a functional group. Because the molecular sieve framework is generally robust to a variety of synthetic conditions, the incorporated organic moieties may be further functionalized with standard protocols in most cases.

36 Claims, 7 Drawing Sheets

OTHER PUBLICATIONS

Maeda, et al., "AlMepO–α: A Novel Open–Framework Aluminum Methylphosphonate with Organo–Lined Unidimensional Channels", *Angew. Chem. Int. Ed. Engl.* 34 (11), pp. 1199–1201 (1995).

Maeda, et al., "Synthesis of Microporous Aluminum Methylphosphonate AlMepO–α by Steam–Induced Topotactic Transformation of AlMepO–β", *Chem. Lett.*, pp. 879–80 (1997).

Maeda, et al., "Structure of Aluminium Methylphosphonate, AlMepO–β, with Unidimensional Channels Formed From Ladder–Like Organic–Inorganic Polymer Chains", *J. Chem. Soc., Chem. Commun.*, pp. 1033–34 (1995).

Sawers, et al., "Ab initio Structure Solution of a Novel Aluminium methylphosphonate from Laboratory X–ray Powder Diffraction Data", *J. Chem. Soc. Dalton Trans.*, pp. 3159–61 (1996).

Maeda, et al., "Synthesis of a Novel Microporous Crystal with Organic Groups Covalently Bonded to the Skeleton", *Studies in Surface Science and Catalysis* 98, pp. 44–45 (1995).

Brunel, et al., "MCM–41 Type Silicas as Supports for Immobilized Catalysts", *Zeolites: A Refined Tool for Designing Catalytic Sites*, pp. 173–180 (1995).

Diaz, et al., "Synthesis and Characterization of Cobalt–Complex Functionalized MCM–41", *Chem. Mater.* 9 (1), pp. 61–67 (1997).

Burkett, et al., "Synthesis of Hybrid Inorganic–Organic Mesoporous Silica by Co–condensation of Siloxane and Organosiloxane Precursors", *Chem. Commun.*, pp. 1367–68 (1996).

Fowler, et al., "Synthesis and Characterization of Ordered Organo–Silica–Surfactant Mesophases with Functionalized MCM–41–type Architecture", *Chem. Commun.*, pp. 1769–1770 (1997).

Macquarrie, et al., "Aminopropylated MCMs as Base Catalysts: A Comparison with Aminopropylated Silica", *Chem. Commun.*, pp. 1781–82 (1997).

Lim, et al., "Synthesis and Characterization of a Reactive Vinyl–Functionalized MCM–41: Probing the Internal Pore Structure by a Bromination Reaction", *J. Am. Chem. Soc.*, 119 (17), pp. 4090–91 (1997).

Itoh, et al., "Synthesis and Application of New Phenyl–Functionalized Zeolites as Protection Against Radical Bromination at the Benzylic Position", *Synlett*, pp. 1450–51 (1997).

Lim, et al., "Synthesis of Ordered Microporous Silicates with Organosulfur Surface Groups and Their Applications as Solid Acid Catalysts", *Chem. Mater.*, 10 (2), pp. 467–70 (1998).

Van Rhijn, et al., "Sulfonic Acid Functionalised Ordered Mesoporous Materials as Catalysts for Condensation and Esterification Reactions", *Chem. Commun.*, pp. 317–18 (1998).

Subba Rao, et al., "1,5,7–Triazabicyclo [4.4.0] dec–5–ene Immobilized in MCM–41: A Strongly Basic Porous Catalyst", *Angew. Chem. Int. Ed. Engl.*, 36 (23), pp. 2661–62 (1997).

Liu, et al., "Hybrid Mesoporous Materials with Functionalized Monolayers", *Adv. Mater.*, 10 (2), pp. 161–65 (1998).

Li, et al., "Synthesis of Zeolites Using Organosilicon Compounds as Structure–Directing Agnets", *Microporous Materials* 3, pp. 117–121 (1994).

Pugin, et al., "Enantioselective Metal Complex Catalysts Immobilized on Inorganic Supports Via Carbamate Links", *Heterogeneous Catalysis and Fine Chemicals III*, pp. 107–14 (1993).

Cauvel, et al. "Monoglyceride Synthesis by Heterogenous Catalysis Using MCM–41 Type Silicas Functionalized with Amino Groups", *J. Org. Chem.* 63 (3), pp. 749–41 (1997).

Culity, Elements of X–Ray Diffraction, 1956, pp. 29, 101–102.*

* cited by examiner

FUNCTIONALIZED MOLECULAR SIEVES

This application claims the benefit of U.S. Provisional Application No. 60/057,652 filed on Aug. 25, 1997 entitled "Organic-Functionalized Crystalline Molecular Sieves", and U.S. Provisional Application No. 60/083,787 filed on May 1, 1998 entitled "Functionalized Molecular Sieves", both by inventors Katsuyuki Tsuji, Christopher W. Jones and Mark E. Davis, and which are incorporated herein by reference.

BACKGROUND

There has been an enormous interest in recent years in exploiting the uniformly sized ar shaped channels and cavities of zeolites and related crystalline molecuar sieves for shape-selective adsorbents and catalysts. Unfortunately, the range of potential substrates and/or reactions are limited by the types of active site functionalities that may be currently engineered into these systems.

Most of the difficulty appears to be related to the small size of the micropores. While playing an essential role in the shape selectively of zeolites and relate molecular sieves, the size restriction also limits the ability to modify the micropores using post-synthetic procedures. For example, in a typical scheme, the free silanol groups dispersed throughout the structure are targeted for further functionalization. However, because exterior surface silanols are much more accessible than those in the interior, most of the functionalization occurs at these exterior sites where shape selectivity is generally not possible.

In another context, organic structure-directing agents ("SDAs") that contain silicon alkoxides that are covalently attached have been prepared. These organosilanes are used to direct the formation of molecular sieves. In this case, the organic component completely fills the void space. Removal of the organic is the only way to create void spaces in these materials and this yields only an inorganic solid. Hence, using organosilanes as structure-directing agents is not a viable vehicle for functionalization since the SDAs' removal would also eliminate the intended functionality.

As a result, new strategies are required for incorporating functional groups into zeolites and related molecular sieves to fully exploit their potential as shape-selective adsorbents and catalysts.

SUMMARY OF THE INVENTION

The present invention generally relates to molecular sieves which have a crystalline framework and include micropores of substantially uniform size and shape formed therein. These micropores contain one or more accessible organic moieties that are linked to the crystalline framework by a carbon-silicon bond. Shape selectivity of the inventive molecular sieves may be modulated by varying the size and shape of the micropores (which is a function of the particular molecular sieve being synthesized) and the organic moiety incorporated therein.

In general, the inventive methods involve crystallizing a mixture which includes a source of silica and at least one organosilane of the formula

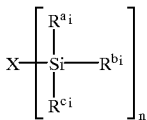

to form a crystalline product, wherein:

n is an integer from 1 to 5;

X is a substituted or unsubstituted moiety and $R^{a_i}, R^{b_i}, R^{c_i}$ are a set of $R^a, R^b$, and $R^c$, s for i=1 to i=n (i.e., $R^{a_1}, R^{b_1}, R^{c_1} \ldots R^{a_{n-1}}, R^{b_{n-1}}, R^{c_{n-1}}, R^{a_n}, R^{b_n}$, and $R^{c_n}$) wherein each R is independently either any hydrolyzable group, or a substituted or unsubstituted moiety, wherein the moiety is selected from the group consisting of $C_1$–$C_{20}$ alkyl, $C_2$–$C_{10}$ alkenyl, $C_2$–$C_{20}$ alkynyl, cycloalkyl, cycloalkenyl, aryl, and heteroaryl, each optionally substituted with one or more substituents selected from the group consisting of $C_1$–$C_5$ alkyl, $C_2$–$C_5$ alkenyl, $C_2$–$C_5$ alkynyl, cycloalkyl, cycloalkenyl, aryl, and heteroaryl, and a functional group, provided that at least one R in the organosilane compound is a hydrolyzable group. In preferred embodiments, at least one R in a set of $R^a$, $R^b$, and $R^c$ is a hydrolyzable group.

The present invention may be practiced both in the presence or absence of a structure directing agent. In preferred embodiments, the inventive methods result in molecular sieves that include crosslinked monomers of the formula

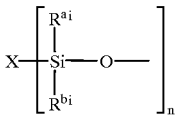

wherein n, X, $R^{a_i}$, and $R^{b_i}$ are as previously described. Optionally, the organic moieties incorporated into the micropores may be further modified post-synthetically to include additional organic groups or to form a coordination complex with a metal or metal-containing ion.

DESCRIPTION OF THE PREFERRED EMBODIMENTS

Figure 1:
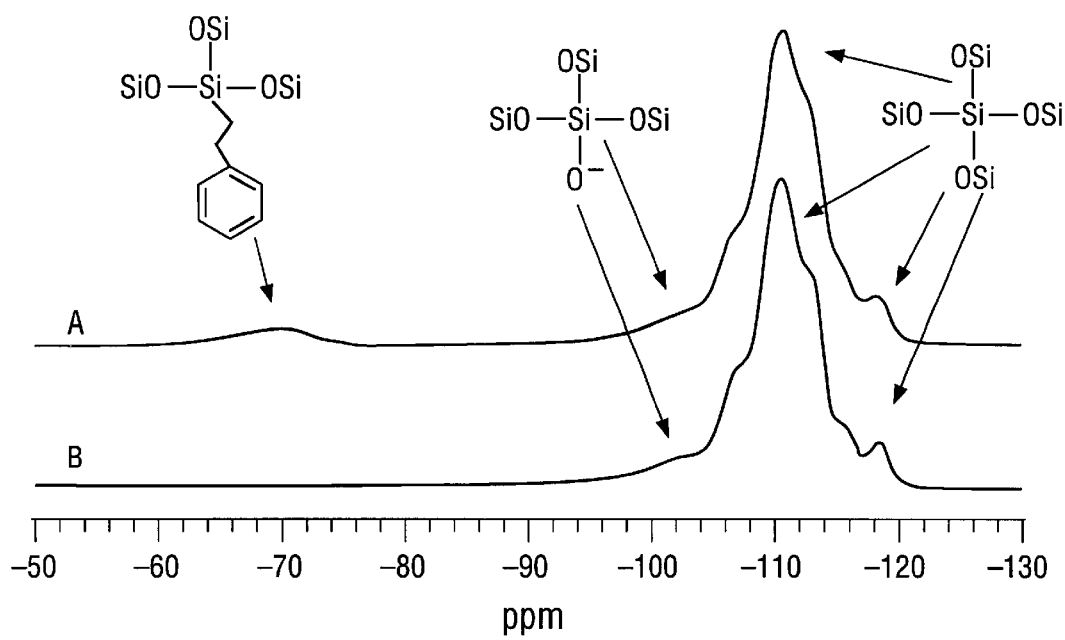
FIG. 1 is a $^{29}$Si CPMAS NMR spectra of a organic-functionalized Beta (a) and of a pure-silica Beta (b). Spectra are from as-synthesized materials and are referenced to TMS.

The present invention generally relates to molecular sieves and more particularly to functionalized molecular sieves that are useful as shape-selective adsorbents, chelating agents, and catalysts. As used herein, molecular sieves are crystalline materials having uniformly sized and shaped micropores (i.e. channels and cavities) formed therein. The width of the micropores are less than or equal to about 15 Å, more preferably less than or equal to about 12 Å. In especially preferred embodiments, the width of the micropores are less than or equal to about 10 Å.

Despite the more liberal adoption of the term in some recent publications, as used herein, the term "zeolite" refers to a crystalline material comprising coordination polyhedra formed only of silicon, aluminum, and oxygen. Non-aluminosilicates, such as pure silicates, silicoaluminophosphates and borosilicates, which also display the characteristic properties of zeolites, namely a crystalline framework structure containing uniformly sized micropores formed therein, are referred to as "zeolite-like materials." Both zeolite and zeolite-like material are encompassed by the term "molecular sieve."

The size and shape of the micropores as well as their arrangement within the framework structure are a function of the particular molecular sieve being synthesized. Because of the diversity of structures, molecular sieves are often categorized by their three letter IZA ("International Zeolite Association") structure designations. For example, zeolite Y (which is also referred to as faujasite) has the structure type FAU and predominantly contains one 12 ring channel (formed from 12 T- or O-atoms) with a width of approximately 7.4 Å. Other molecular sieves having the FAU structure type include berryllophosphate X, SAPO-37, and Linde X. In contrast, zeolite-like material Beta predominantly includes two types of micropores and has the structure type BEA. The first is a 12 ring channel with a width of 5.5 Å and the second is also a 12 ring channel with a dimension of 7.6 Å by 6.4 Å. Another molecular sieve having the structure type BEA is tschernichite.

The inventive method for preparing functionalized molecular sieves may be practiced with any zeolite or zeolite-like material. A publication entitled "Atlas of Zeolite Structure Types," Fourth Revised Edition (1996) by authors W. M. Meier, D. H. Olson and Ch. Baerlocher, is a good source of the known structure types for zeolites and zeolite-like materials (as of the publication date) and is incorporated herein by reference in its entirety. In addition to the structural information such as framework density, loop configuration of T-atoms, and channel configurations, this book includes the relevant references for the listed molecular sieves. As new zeolite and zeolite-like materials are recognized by the Structure Commission of the International Zeolite Association, they are currently published on the world wide web both in Europe (http://www.iza-sc.ethz.ch/IZA-SC/) and on a mirror site in North America (http://www-iza-sc.csb.yale.edu/IZA-SC/).

The inventive methods for preparing functionalized molecular sieves generally involve crystallizing a mixture which includes a source of silica and at least one organosilane of the formula

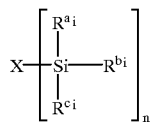

to form a crystalline product, wherein:

n is an integer from 1 to 5;

X is a substituted or unsubstituted moiety; and $R^{ai}, R^{bi}, R^{ci}$ are a set of $R^a, R^b$, and $R^c$, s for i=1 to i=n (i.e., $R^{a_1}, R^{b_1}, R^{c_1} \ldots R^{a_{n-1}}, R^{b_{n-1}}, R^{c_{n-1}}, R^{a_n}, R^{b_n}$, and $R^{c_n}$) wherein each R is independently either any hydrolyzable group, or a substituted or unsubstituted moiety wherein the moiety is selected from the group consisting of $C_1$–$C_{20}$ alkyl, $C_2$–$C_{20}$ alkenyl, $C_2$–$C_{20}$ alkynyl, cycloalkyl, cycloalkenyl, aryl, and heteroaryl, each optionally substituted with one or more substituents selected from the group consisting of $C_1$–$C_5$ alkyl, $C_2$–$C_5$ alkenyl, $C_2$–$C_5$ alkynyl, cycloalkyl, cycloalkenyl, aryl, and heteroaryl, and a functional group, provided that at least one of the Rs in the organosilane compound is a hydrolyzable group.

For example, when n is 2, the organosilane is:

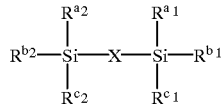

The one or more hydrolyzable groups allow the organosilane compound to crosslink to the framework of the molecular sieve. Optionally, the reaction mixture may include a plurality of different organosilane compounds.

Specific examples for certain terms follow but it should be understood that they are intended to be nonlimiting, even without explicit designating language such as "include but not limited to." Examples of a suitable hydrolyzable group include hydrogen, $C_1$–$C_{10}$ alkoxy, aryloxy, and halide, more preferably $C_1$–$C_5$ alkoxy (such as methoxy, ethoxyl, propoxy, butoxy) and chloride. Illustrative cycloalkyls and cycloalkenyls include cyclopentyl, cyclohexyl, cyclooctyl, cyclopentenyl, cyclohexenyl, and cyclooctenyl. Examples of aryl and heteroaryl groups include phenyl, naphthyl, pyrryl, furyl, thienyl, pyridyl, quinolyl, and isoquinolyl. Illustrative examples of a functional group include alcohol, sulfonic acid, phosphine, thiol, thioether, ketone, aldehyde, ester, ether, amine, imine, amide, imide, imido, nitro, carboxylic acid, disulfide, carbonate, isocyanate, carbodiimide, carboalkoxy, carbamate, acetal, ketal, boronate, cyano, cyanohydrin, hydrazine, oxime, hydrazide, enamine, sulfone, sulfide, sulfenyl, and halogen.

In preferred embodiments, n is 1 or 2; and the organosilane is of the general formula

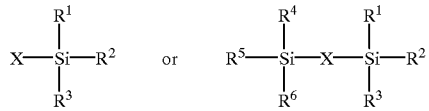

wherein:

X is a substituted or unsubstituted moiety and $R^1, R^2, R^3, R^4, R^5$, and $R^6$ are each independently either any hydrolyzable group, or a substituted or unsubstituted moiety wherein the moiety is selected from the group consisting of $C_1$–$C_{20}$ alkyl, $C_2$–$C_{10}$ alkenyl, $C_2$–$C_{20}$ alkynyl, cycloalkyl, cycloalkenyl, aryl, and heteroaryl, each optionally substituted with one or more substituents selected from the group consisting of $C_1$–$C_5$ alkyl, $C_2$–$C_5$ alkenyl, $C_2$–$C_5$ alkynyl, cycloalkyl, cycloalkenyl, aryl, and heteroaryl, and a functional group, provided that at least one of $R^1$, $R^2$, and $R^3$ is a hydrolyzable group.

For simplicity, the more general nomenclature of $R^{a_1}$, $R^{b_1}$, $R^{c_1}$, $R^{a_2}$, $R^{b_2}$ and $R^{c_2}$ have been replaced with $R^1$, $R^2$, $R^3$, $R^4$, $R^5$, and $R^6$ respectively in these structures. However, the preferred embodiments for $R^1$, $R^2$, $R^3$, $R^4$, $R^5$, and $R^6$ are also applicable to each set of $R^{a_i}$, $R^{b_i}$, $R^{c_i}$ where i is from 1 to n in the general organosilane formula.

In more preferred embodiments, the moiety group (which may be either substituted or unsubstituted) forming any combination of X, $R^1$, $R^2$, $R^3$, $R^4$, $R^4$, and $R^6$ (provided that at least one of $R^1$, $R^2$, and $R^3$ is a hydrolyzable group), is preferably selected from the group consisting of $C_1$–$C_{10}$ alkyl, $C_2$–$C_{10}$ alkenyl, phenyl, and benzyl, each optionally substituted with $C_1$–$C_5$ alkyl, $C_2$–$C_5$ alkenyl, $C_2$–$C_5$ alkynyl, cycloalkyl, cycloalkenyl, aryl, and a functional group.

In even more preferred embodiments, $R^1$, $R^2$, $R^3$, $R^4$, $R^5$, and $R^6$ are the same and are a hydrolyzable group selected from the group consisting of $C_1$–$C_5$ alkoxy, aryloxy, and halide; and X is selected from a group consisting of $C_1$–$C_{10}$ alkyl, $C_2$–$C_{10}$ alkenyl, $C_1$–$C_{10}$ alkylbenezene, and $C_1$–$C_{10}$ dialkylether, each optionally functionalized with one or more functional groups selected from the group consisting of alcohol, sulfonic acid, phosphine, thiol, thioether, ketone, aldehyde, ester, ether, amine, imine, amide, imide, imido, nitro, carboxylic acid, disulfide, carbonate, isocyanate, carbodiimide, carboalkoxy, carbamate, acetal, ketal, boronate, cyano, cyanohydrin, hydrazine, oxime, hydrazide, enamine, sulfone, sulfide, sulfenyl, and halogen.

In especially preferred embodiments, the organosilane is of the formula

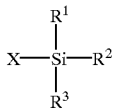

wherein $R^1$, $R^2$, and $R^3$ are the same and are a hydrolyzable group selected from the group consisting of methoxy, ethoxy, propoxy, butoxy, and halide; and X has the general formula

wherein m is from 1 to 10 and Z is selected from the group consisting of cycloalkenyl, aryl, heteroaryl and a functional group selected from the group consisting of alcohol, sulfonic acid, thiol, amine, amide, nitro, carboxylic acid, cyano, and halogen. In the most preferred embodiments, $R^1$, $R^2$, and $R^3$ are the same and are methoxy or chloride and X is

wherein m is from 1 to 10 and Z is selected from the group consisting of cyclopentenyl, cyclohexenyl, phenyl, naphthyl, pyrryl, furyl, thienyl, pyridyl, quinolyl, and isoquinolyl.

Illustrative examples of preferred organosilanes for the practice of the present invention include but are not limited to: phenethyltrimethoxysilane; 3-aminopropyltrimethoxysilane; [2-(3-cyclohexenyl)ethyl]trimethoxysilane; 1,4-bis(trimethoxysilylethyl)benzene); 7-octenyltrimethoxysilane; hexyltrimethoxysilane; [2-(3-cyclohexenyl)ethyl]trichlorosilane; octyltriethoxylsilane; bromoundecyltrimethoxysilane; allyltrimethoxysilane; 3-bromopropyltrimethoxysilane; 3-iodopropyltrimethoxysilane; 2-cyanoethyltrimethoxysilane; 3-mercaptopropyltrimethoxysilane; 2-(4-chlorosulfonylphenyl)ethyltrimethoxysilane; 2-(trimethoxysilylethyl)pyridine; (N,N-dimethylaminopropyltrimethoxysilane; N-trimethoxysilylpropyl-N,N,N-trimethylammonium chloride; methyltrimethoxysilane; and mixtures thereof.

The source of silica may be silica itself or any silica precursor such as silicates, silica hydrogels, silicic acids, colloidal silica, fumed silica, tetraalkyl orthosilicates, and silica hydroxides. When the molecular sieve framework includes other metals such as aluminum, gallium, iron, boron, titanium, zirconium, phosphorous, tin, and mixtures thereof, the crystallization mixture will further include a source of the appropriate metal. For example, zeolites are aluminosilicates and thus include aluminum atoms that are covalently bonded through oxygen to silicon atoms. As a result, in addition to the source of silica, zeolite synthesis requires a source of alumina.

Molecular sieves that require the assistance of a structure directing agent ("SDA") as well as those that do not, may both be functionalized using the inventive methods. Typically quaternary bases, commonly used SDAs include: tetrapropylammonium fluoride, tetraethylammonium fluoride, tripropylamine, ethyldiamine, propanolamine, ethanolamine methyl quinuclide, ($NH_3$ and alcohol), glycerol n-propylamine, di-n-butylamine, di-n-propylamine, 1,5-diaminopentane, 1,6-diaminohexane, morpholine, pentaerythritol, dipropylenetriamine, dihexamethylenetriamine, triethylenetetramine, triethylenetetramine, diethylenetetramine, 1-alkyl-4-azonibicyclo[2,2,2], octane-4-oxide halide, hexanediol, propylamine, tetrapropylammonium hydroxide, tetraethylammonium hydroxide, choline hydroxide, $Et_3N$, $Bu_3N$, $(CH_2CH_2OH)_3N$, cyclohexylamine, N,N'dimethylbenzylamine, diethylethanediamine, aminodiethylethanolamine, dimethylethanolamine, methyldiethanolamine, methylethanolamine, picoline, diethylpiperazzine, 1,4-diazobicyclo[2,2,2]octane ($C_6H_{12}N_2$), N-methylpiperidine, 3-methylpiperidine, N-methylcyclohexylamine, dicyclohexylamine, and ethyl-n-butylamine.

Any SDA that is subsequently extractable from the crystalline product (to create the desired microporosity) without significantly affecting the framework structure or the incorporated organic moiety may be used in the practice of the present invention. As a result, before a particular SDA is used, it must first be determined if the SDA may be appropriately removed. Illustrative examples of suitable structure directing agents that may be readily extracted include but are not limited to tetraethylammonium fluoride ("TEAF") for making Beta; hexamethylenediamine HF salt ("HMDA•2HF") for making zeolite ZSM-5; and 15-crown-5 for making SDA-assisted NaY.

The inventive methods result in molecular sieves having a crystalline framework and micropores of substantially uniform size and shape formed therein, and include organosilane monomers that are covalently attached to the crystalline framework. At least a portion of the monomers are bonded to the framework so that said monomers are at least partially exposed within the micropores. The monomers are of the general formula

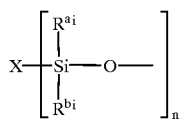

wherein n, X, $R^{a_1}$, and $R^{b_1}$ are previously defined which are covalently attached to the molecular sieve framework via the one or more oxygens. In preferred embodiments wherein n is 1 or 2, the crosslinked or covalently attached monomers are

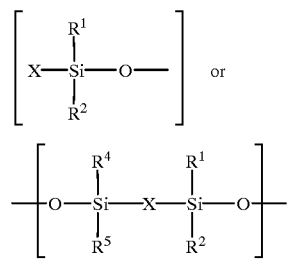

wherein:

X is a substituted or unsubstituted moiety and $R^1$, $R^2$, $R^4$, and $R^5$ are each independently either oxygen, or a substituted or unsubstituted moiety. The identities of the substituted and unsubstituted moieties are as previously described.

Optionally, the organic moieties incorporated into the micropores may be further functionalized. Functional groups that may be added post-synthetically to the incorporated organic moiety include but are not limited to alcohol, sulfonic acid, thiol, amine, amide, nitro, carboxylic acid, and halogen. For example, an organic moiety containing a phenyl ring may be sulfonated or nitrated to form a sulfonated or nitrated phenyl group respectively. In another example, a nitro acid group may be subsequently reduced to an amine which in turn may be further reacted to form a variety of other functional groups. In yet another example, a double bond (i.e. cyclohexenyl group) may be reacted with thiolacetic acid to give a protected thiol group (—SCOCH$_3$) which may be subsequently deprotected to form a thiol (—SH). Because the molecular framework is generally robust to a variety of synthetic conditions, the incorporated organic moiety may be further functionalized with standard organic chemistry protocols in most cases. Synthetic protocols for these reactions and as well as many others may be found, for example, in "Advanced Organic Chemistry," Third Edition (1985) by Jerry March which is also incorporated by reference herein.

In addition, further functionalization may include the formation of a coordination complex between the incorporated organic moiety and a metal or metal-containing ion. In the simplest case, a functional group such as amines, thiols and carboxylic acids can interact with one or more metal-containing ions to form active metal centers. For example, the one or more amines within may be further functionalized by contacting the inventive molecular sieve with a source of a metal-containing ion such as $Al^{3+}$, $Ag^+$, $Co^{2+}$, $Co^{3+}$, $Cu^+$, $Cu^{2+}$, $Fe^{2+}$, $Fe^{3+}$, $Hg^{2+}$, $Mn^{2+}$, $Mn^{4+}$, $Mn^{7+}$, $Ni^{2+}$, $Ti^{3+}$, $Ti^{4+}$, $UO_2^{2+}$, and $Zn^{2+}$. The resulting metal functionalized molecular sieve may then be used for chelation as well as a variety of metal-mediated reactions such as oxidation and reduction. In particular, because of their ability to directly bind oxygen, $Cu^{2+}$ and $Fe^{3+}$ may be used to activate oxygen in a number of oxidative reactions.

For the purposes of clarity, the specific details of the present invention will be illustrated with reference to especially preferred functionalized molecular sieves. Molecular sieves that are synthesized in the presence of a structure directing agents are these require additional post-synthetic steps such as SDA removal. However, it should be appreciated that these embodiments and appended examples are for purposes of illustration only and are not intended to limit the scope of the present invention.

Beta was synthesized using TEAF as the SDA in the presence of phenethyltrimethoxysilane ("PETMS"). Based on the procedure of Camblor et al. (*Chem. Commun.* 2365–2366 (1996)) for the synthesis of pure-silica Beta using TEAF as the SDA, a hybrid material with 5 atom % or less (2.8 atom % for the sample described here) of the silicon substituted by PETMS was crystallized. The X-ray diffraction pattern of the hybrid material clearly identified the resulting molecular sieve as crystalline Beta.

FIG. 1 shows the $^{29}$Si cross-polarization magic angle spinning ("CPMAS") NMR spectra for the as-synthesized, pure-silica Beta and the organic-functionalized Beta. It is clear from the spectrum of the hybrid material that the phenethyl group (presence of aromatic ring verified by Raman spectroscopy) is covalently linked to a framework silicon atom (peak at −68 ppm: C—Si—O$_3$4). This resonance indicates that the linking silicon atom is fully condensed into the framework.

Any organic functionalities on the exterior surface of the Beta crystals were removed by reacting the as-synthesized material with concentrated sodium hydroxide solutions (8 M NaOH, 5% methanol, 25° C., 1 hour). The structure directing agent, TEAF, was subsequently extracted from the hybrid material through repeated exposures to acetic acid/water mixtures at 140° C. As determined by thermogravimetric analysis, essentially complete TEAF removal was accomplished (>99%). The extracted functionalized molecular sieve is sulfonated by contact with vapor from 30% $SO_3/H_2SO_4$ at room temperature after heating at approximately 100° C. under a vacuum of less than 10$^{-6}$ Torr overnight. Following sulfonation, the sample was washed with water and then was washed with dioxane to remove residual sulfuric acid resulting from the sulfonation procedure. Scanning electron microscopy ("SEM") images of this fully modified material did not appear different than the images of the as-made material.

Figure 2:
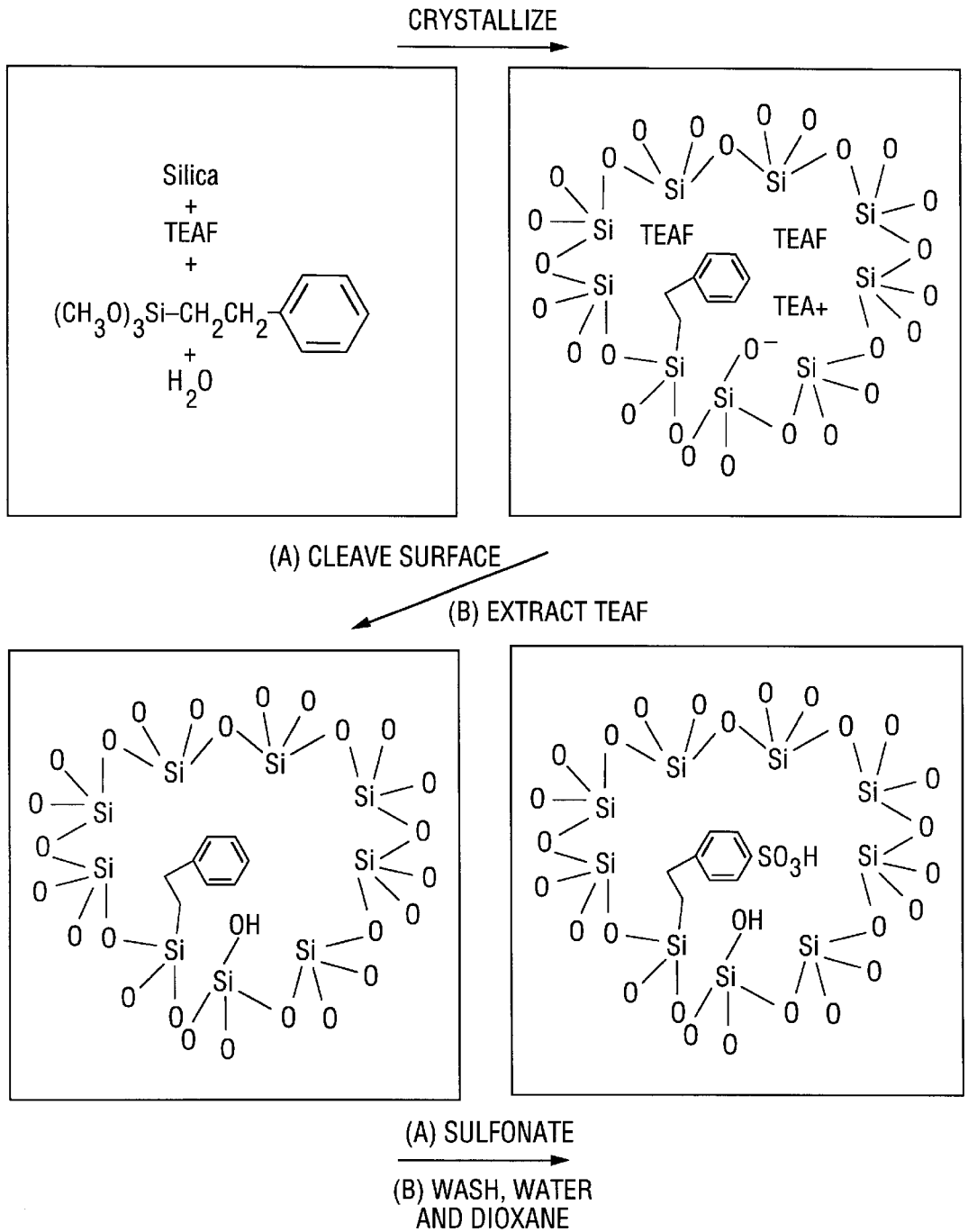
FIG. 2 is a schematic illustration of the preparation procedures used to create a sulfonic acid-functionalized molecular sieve.

Before use as a catalyst, the material is dehydrated at ~100° C. for at least 6 hours under a vacuum of less than 10$^{-6}$ Torr. FIG. 2 schematically summarizes the above described synthetic procedure.

Raman spectroscopy was used to characterize the organic-functionalized materials. Spectra were obtained with a Nicolet Raman 950 stand-alone FT-Raman accessory using Happ-Genzel apodization.

Figure 3A:
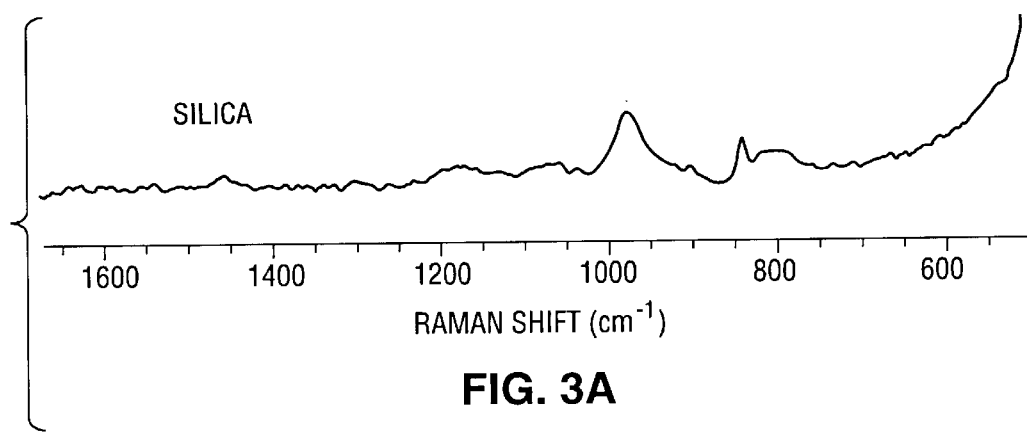
FIGS. 3A–3C are Raman spectra for silica, functionalized silica, and sulfonated silica.
Figure 3B:
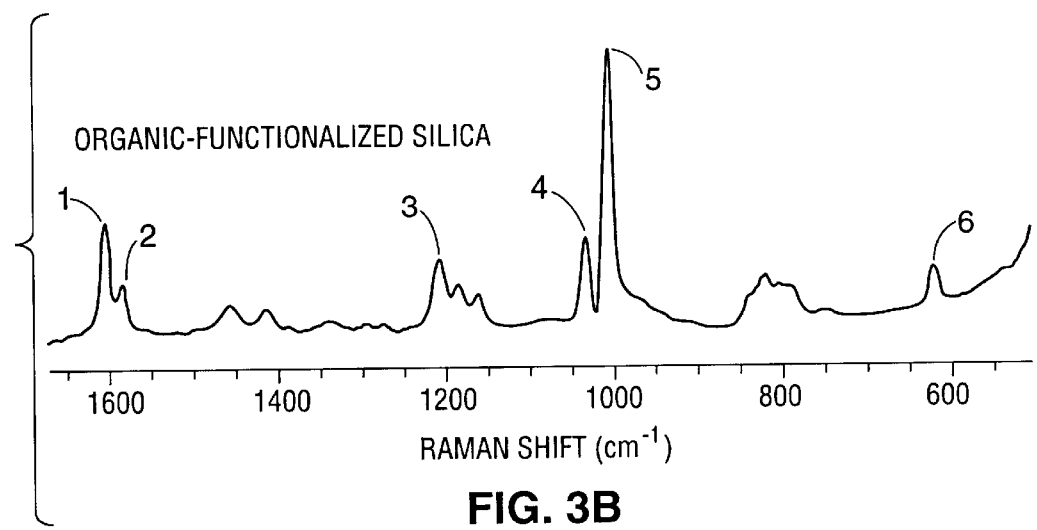
Figure 3C:
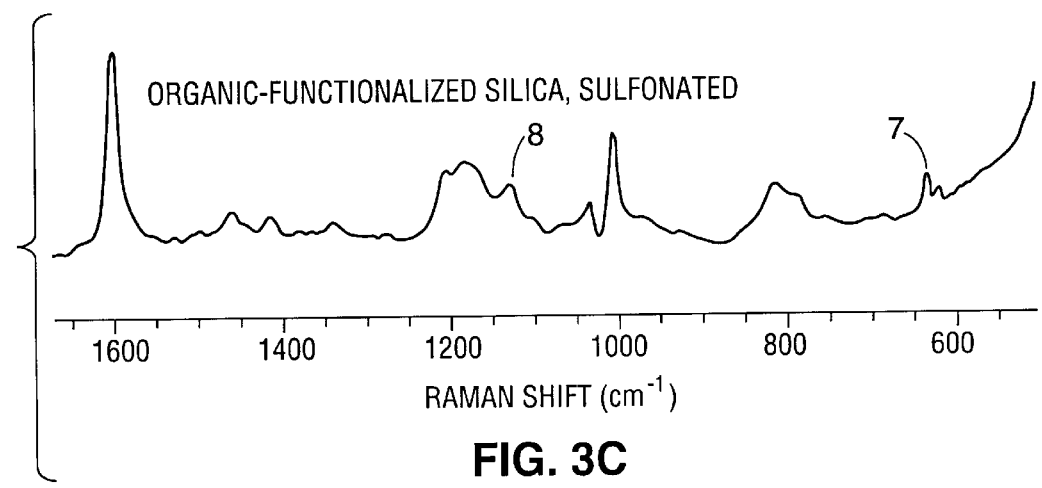

FIGS. 3A–3C are spectra for silica, organic-functionalized silica, and sulfonated organic-functionalized silica. Notable peaks are marked and numbered as follows:

| | |
|---|---|
| i) aromatic ν C=C | 1600 cm$^{-1}$ |
| ii) aromatics ν C=C | 1585 cm$^{-1}$ |

-continued

| | | |
|---|---|---|
| iii) Si—CH$_2$—R | 1205 cm$^{-1}$ | |
| iv) aromatic δ C—H | 1030 cm$^{-1}$ | |
| v) aromatic ν C═C sym | 1000 cm$^{-1}$ | |
| vi) aromatic ring in-plane bend | 622 cm$^{-1}$ | |
| vii) aromatic ν skeletal | 636 cm$^{-1}$ | |
| viii) hydrated sulfonic acid SO$_3$ stretch | 1125 cm$^{-1}$ | |

The spectra indicate that the phenethyl silicon species have been incorporated into the sample. In addition, the peaks numbered 1, 2, 4, 5, and 6 are characteristic of a mono-substituted phenyl ring. After sulfonation, two new peaks appear. At 1125 cm$^{-1}$ (peak 8) the sulfonic acid SO$_3$ stretch appears.

In addition, a 636 cm–1 (peak 7) is apparent. This is characteristic of a para-substituted phenyl group. Both peaks match the corresponding resonances in the Raman spectrum of para-toluenesulfonic acid (spectrum not shown). Notably, complete sulfonation has not been achieved as shown by the presence the monosubstituted phenyl peak 6 in the FIG. 3C.

Figure 4A:
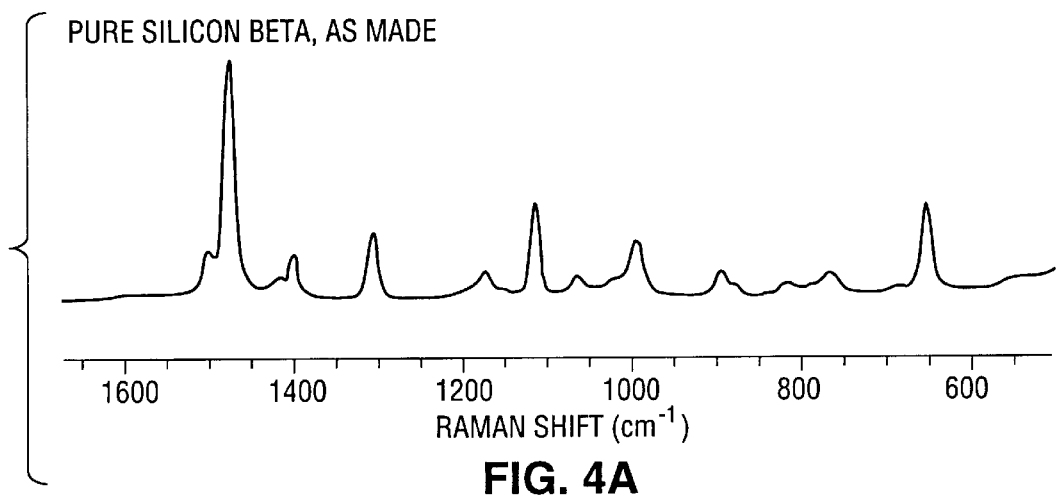
FIGS. 4A–4C are Raman spectra for pure Beta, functionalized Beta, and extracted and sulfonated Beta.
Figure 4B:
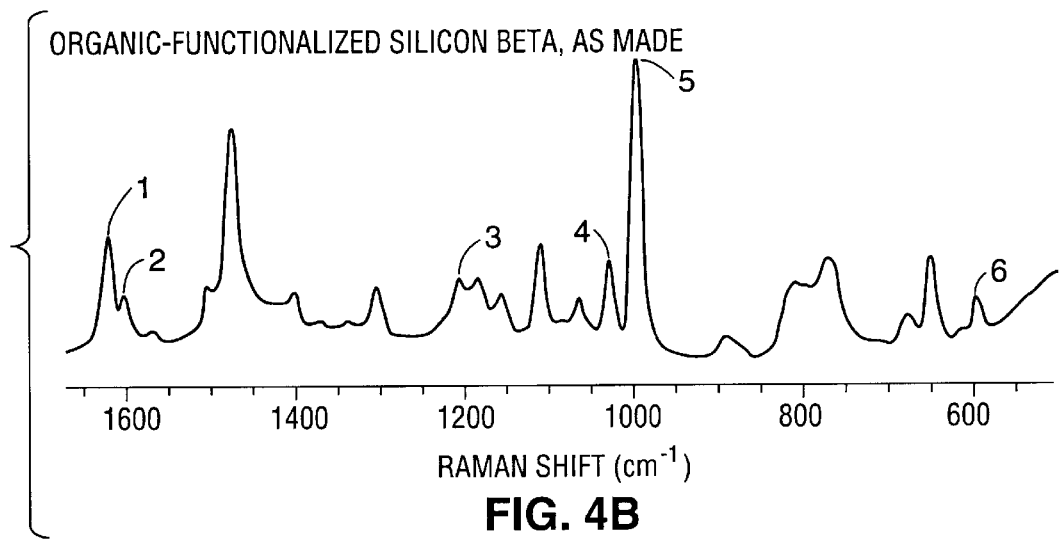
Figure 4C:
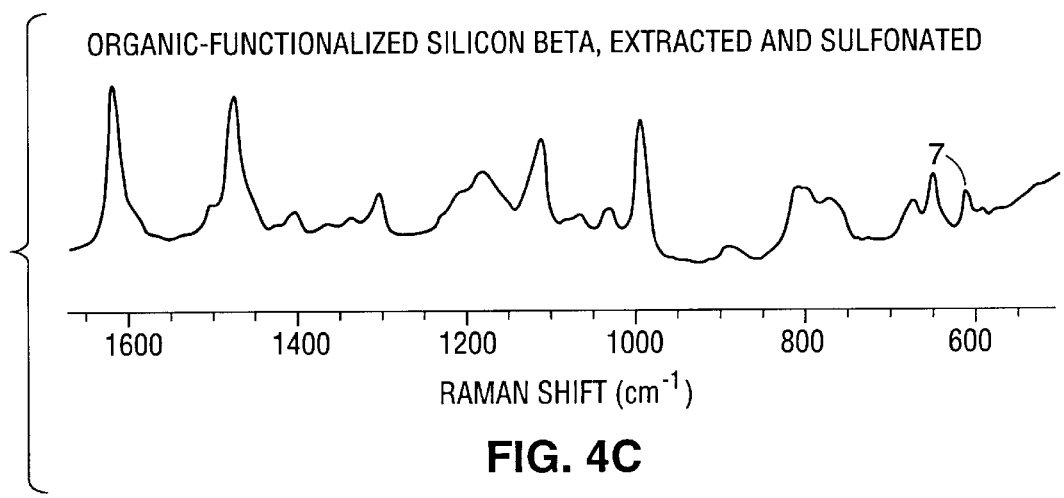

FIGS. 4A–4C are analogous spectra for the functionalized molecular sieve. However, the functionalized molecular sieve sample used to generate FIG. 4C is only partially extracted. Although the presence of TEAF makes the spectra more complex, it was chosen because the sample also contained the largest amount of PETMF. Peaks 1–7 are analogous to the silica-supported case. However, due to increased complexity of the spectra, the SO$_3$ stretch is not as apparent but the presence of a para-substituted sulfonic acid can be inferred from peak 7.

Figure 5:
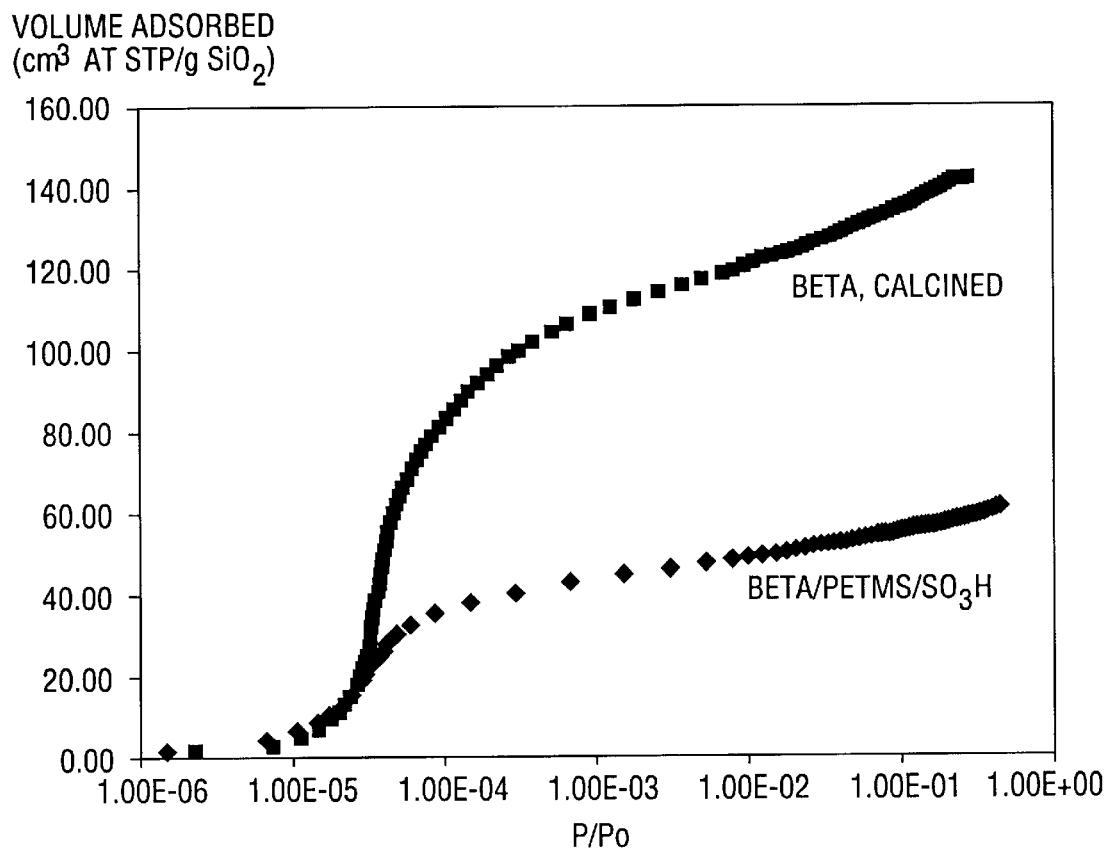
FIG. 5 is a nitrogen adsorption isotherm at 77K of the extracted functionalized molecular sieve materials shown in reference to the calcined sample.

FIG. 5 is a nitrogen adsorption isotherm at 77K which shows that the extracted, functionalized sample retains significant microporosity. The adsorption isotherm conditions were similar to the pretreatment used prior to catalytic reactions which involved degassing the samples at 120° C. under 10$^{-2}$ Torr pressure. As expected, the lower adsorption uptake for Beta/PETMS/SO$_3$H is due to the presence of a partially hydrated, tethered sulfonic acids within the micropores.

Catalytic activity and shape selectivity of the sulfonated, extracted phenethyl-functionalized Beta ("Beta/PETMS/SO$_3$H") was demonstrated by the reaction of cyclohexanone ("HEX") or 1-pyrenecarboxaldehyde ("PYC") with ethylene glycol. The two reactions are shown below:

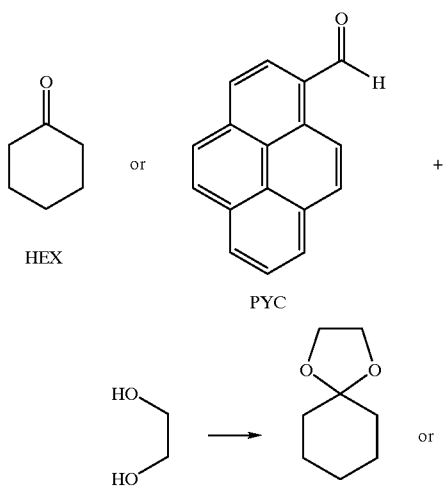

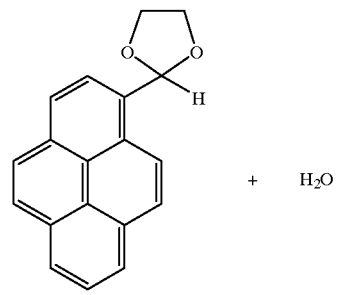

Both reactions were conducted in magnetically stirred glass reactors at 70° C. for 24 hours. The reactor was charged with 9 g toluene, 10 mmole of each reactant, and approximately 10 mg catalyst. Products were identified by gas chromatography using authentic samples.

The Beta/PETMS/SO$_3$H is an active catalyst for the formation of 2,2-pentamethylene-1,3-dioxolane (cyclic ketal) from ethylene glycol and HEX. This activity is due to the phenyl-sulfonic acid groups covalently linked to the zeolite framework.

TABLE 1

| Catalyst | Conversion (%) of HEX |
|---|---|
| None | <2 |
| CPT-240 | <2 |
| CPT-240/PETMS | <2 |
| CPT-240/PETMS/SO$_3$H* | 71.0 |
| Si-Beta, as-made | <2 |
| Si-Beta, extracted | <2 |
| Si-Beta, sulfonated | <2 |
| Si-Beta/PETMS, as-made | <2 |
| Si-Beta/PETMS, as-made sulfonated | <2 |
| Si-Beta/PETMS, extracted | <2 |
| Si-Beta/PETMS, extracted, SO$_3$H* | 72.0 |
| Para-toluenesulfonic acid | 70.0 |
| Para-toluenesulfonic acid, NPM[1] | 0 |
| Para-toluenesulfonic acid[2] | 40.0 |
| CPT-240/PETMS/SO$_3$H, NPM[1] | 0 |
| CPT-240/PETMS/SO$_3$H[2] | 40.0 |

[1]No conversion for both HEX and PYC. NPM poisons all active sites in CPT-240 and Para-toluenesulfonic acid, unlike Beta.
[2]Conversion of PYC
*CPG-240/PETMS/SO$_3$H: ~0.13 mmol H$^+$/g cat.
**Si-Beta/PETMS, extracted, SO$_3$H: ~0.14 mmol H$^+$/g cat.

As shown by Table 1, para-toluenesulfonic acid monohydrate, phenyl-sulfonic acid anchored to controlled-pore-glass ("CPG-240", mean pore diameter 240 Å), and Beta/PETMS/SO$_3$H are active catalysts for the HEX conversion. Neither the intermediates in the functionalized molecular sieve synthesis pathway nor the non-functionalized, pure-silica materials displayed any catalytic activity. Taken together, these results clearly indicate that the phenyl-sulfonic acids on Beta/PETMS/SO$_3$H are the catalytically active sites. Shape selectivity of the inventive functionalized molecular sieves is demonstrated by the reaction of ethylene glycol with PYC, which is too large to enter the Beta pore system. As shown by Table 1, both HEX and PYC react with ethylene glycol over para-toluenesulfonic acid monohydrate to form a ketal or acetal. These two reactions were used to elucidate the location of the phenyl-sulfonic acid moieties in the Beta/PETMS/SO3H material.

Figure 6:
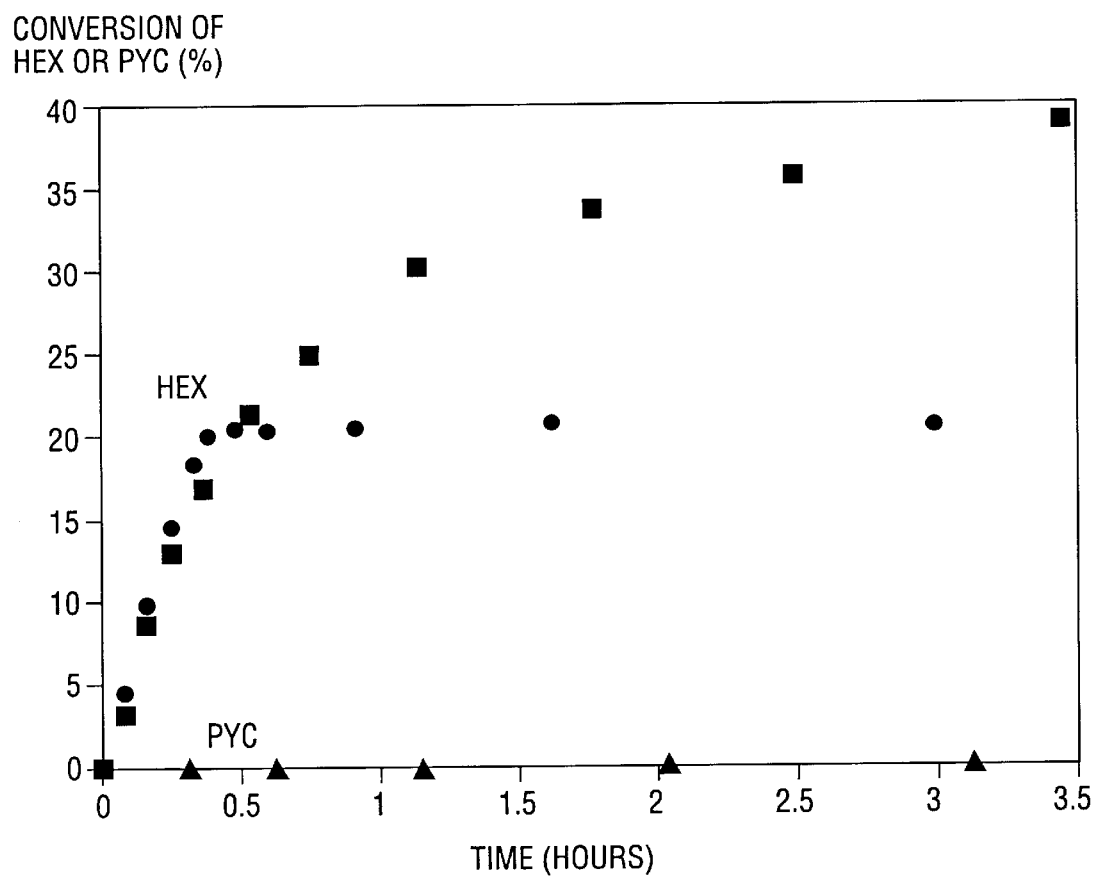
FIG. 6 is a plot demonstrating the occurrence of shape-selective catalysis over organic-functionalized Beta. Reactions of PYC (▲) and HEX (■, ●). 27.5 mg NPM added at 1.15 hours for the experiment denoted by (■) and 100 mg Et$_3$N added at 0.5 hours for the experiment denoted by (●).
Figure 7:
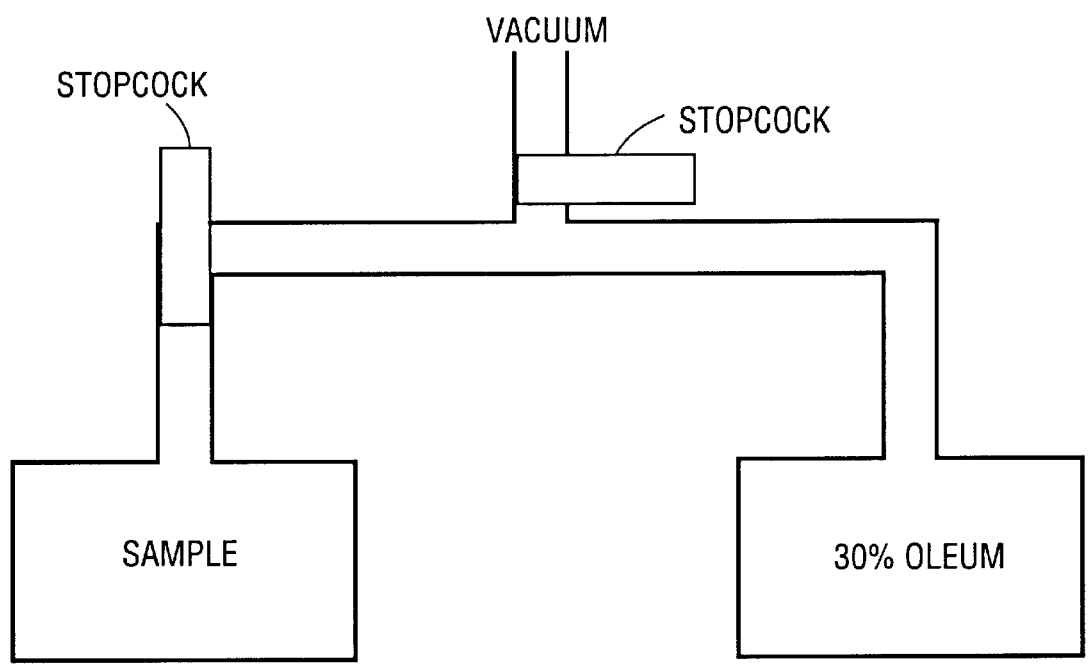
FIG. 7 is a schematic of an apparatus used in an exemplary sulfonation procedure.

FIG. 6 illustrates the conversion of PYC or HEX as a function of time using Beta/PETMS/SO$_3$H as a catalyst. The reaction conditions were similar to those for the data in Table 1. Reactions were conducted in magnetically stirred glass reactors at 70° C. The reactor was charged with 10 g toluene, 10 mmole of reactants in the case of HEX or 3 mmole in the case of PYC, and 13 mg catalyst. Samples were taken periodically and analyzed by GC/MS spectroscopy.

The acetal of PYC is undetectable over the initial 3.5 hours of contact. We surmise this is due to the lack of a sufficient quantity of surface catalytic sites that would be required to react the bulky PYC within this timeframe. In contrast, HEX is readily converted to its ketal. Upon the addition of di(2-naphthyl)-2pyrrolidinemethanol ("NPM" which is a bulky poison that cannot access the Beta pore system) after 1.15 hours of reaction, the conversion of HEX proceeds, thus indicating that the active sites are intrazeolitic. Addition of a small poison that can enter the molecular sieve pores, triethylamine ("$Et_3N$"), stops all reaction at 0.5 hours, as indicated by the data in FIG. 6.

As a further control, phenethyl sulfonic acid sites were prepared on the surface of CPG-240. This material has a uniform pore diameter of 240 Å and cannot be a shape-selective catalyst. Over this catalyst, both HEX and PYC were converted, as denoted in Table 1. However, if NPM is added at the outset neither HEX or PYC is reacted. Thus, the shape-selectivity of the inventive molecular sieve catalyst is demonstrated by the fact that NPM poisons all active sites in CPG-240/PETMS/$SO_3H$, but has little affect on Beta/PETMS/$SO_3H$.

A commercial Beta (PQ, Si/Al=25) is able to catalyze the reaction demonstrated here. However, in the absence of the surface poison NPM, there is significant conversion of PYC by this catalyst (initial rates: HEX/PYC=16, same conditions as those for experiments described in FIG. 6). Thus, the aluminosilicate is not as shape selective because of the reactivity of the external crystal surface. Also, there are no proven examples of shape-selective catalysis with organic functionalized mesoporous solids. The pores of the mesoporous MCM-41 type materials can be constricted into the micropore range by silanation treatments. However, these modifications will probably not result in a single, fixed-diameter pore opening as found in crystalline silicate molecular sieves. Instead, a distribution of pore sizes would be expected. In addition, the crystalline functionalized molecular sieves are physically and chemically more robust than amorphous, mesoporous materials.

The functionalized materials of the type described here provide new opportunities for both shape-selective catalysis and adsorption. In principle, any functional group that assists in substrate specificity or catalyzes homogeneous reactions can be "tailor-made" into an intrazeolitic organic moiety.

EXAMPLE 1

Synthesis of Beta (BEA structure type)

A solution of tetraethylammonium fluoride ("TEAF") (3.04 g, 16.5 mmol) in water (20 ml) was added to the 100 ml flask containing tetraethylorthosilicate ("TEOS") (6.38 g, 30 mmol, 98% Aldrich). The mixture was stirred overnight resulting in a white slurry. The byproducts of the reaction, ethanol and excess water, were removed by evaporation at 50° C. to yield a wet solid. Water was added to the solid as necessary to adjust the water content to the following gel composition:

1 $SiO_2$/0.54 TEAF/7 $H_2O$

The gel was transferred to a Teflon lined rotating autoclave (approximately 60 rpm) and heated to 140° C. After 5 days, the product was recovered by filtration, washed with water and acetone, and dried at room temperature. The product had the characteristic x-ray diffraction pattern for Beta (BEA structure type).

EXAMPLE 2

Synthesis of Beta with PETMS using TEAF as the SDA

Phenethyltrimethoxysilane ("PETMS") (0.136 g, 0.6 mmol, Gelest) was added to the 100 ml flask containing tetraethylorthosilicate ("TEOS") (6.38 g, 30 mmol, 98% Aldrich) and a stir bar. A solution of tetraethylammonium fluoride ("TEAF") (3.04 g, 16.5 mmol) in water (20 ml) was added by pipette while stirring. The solution was stirred overnight resulting a white slurry. The byproducts of the reaction, ethanol and excess water, were removed by evaporation at 50° C. to yield a wet solid. Water was added to the solid as necessary to adjust the water content to the following gel composition:

1 $SiO_2$/0.02 PETMS/0.55 TEAF/7 $H_2O$.

The gel was transferred to a Teflon lined rotating autoclave (approximately 60 rpm) and heated to 140° C. After 27 days, the product was recovered by filtration, washed with water and acetone, and dried at room temperature. The product had the characteristic x-ray diffraction pattern for Beta (BEA structure type).

EXAMPLE 3

Synthesis of Beta with PETMS using TEAOH/HF as the SDA

Phenethyltrimethoxysilane ("PETMS") (0.136 g, 0.6 mmol, Gelest) was added to the 100 ml flask containing tetraethylorthosilicate ("TEOS") (6.38 g, 30 mmol, 98% Aldrich) and a stir bar. A solution of tetraethylammoniumhydroxide ("TEAOH") (6.92 g, 16.4 mmol, 35% in water, Aldrich) was added by pipette while stirring. The solution was stirred overnight resulting in a homogeneous clear solution. The byproducts of the reaction, ethanol and excess water, were removed by evaporation at 50° C. The solution was then transferred to Teflon vessel and water was added as necessary to adjust the water content. At this point, hydrofluoric acid ("HF") (0.69 g, 16.4 mmol, 48% in water Mallinkrodt) was added to the solution while stirring to yield a white gel. The composition of the resulting gel was:

1 $SiO_2$/0.02 PETMS/0.55 TEAF/7 $H_2O$

The gel was transferred to a Teflon lined rotating autoclave (approximately 60 rpm) and heated to 140° C. After 33 days, the product was recovered by filtration, washed with water and acetone, and dried at room temperature. The product had the characteristic x-ray diffraction pattern for Beta (BEA structure type).

EXAMPLE 4

Synthesis of Beta with other organosilanes

Beta was synthesized with a variety of organosilanes with either TEAF or TEAOH/HF as the SDA. Unless otherwise noted, the ratio of $SiO_2$ to the organosilane was 0.02 and the final product displayed the characteristic x-ray diffraction pattern of Beta.

APTMS

The synthesis of Beta with 3-aminopropyltrimethoxysilane ("APTMS") was similar to that described in Example 2 except that APTMS (0.108 g, 0.6 mmol, Gelest) was used instead of PETMS. The final product was recovered after 41 days of heating at 140° C. in the rotating autoclave.

Beta with increasing amount of APTMS were also made. Reaction with 0.269 g of APTMS (1.5 mmol, Gelest) and 3.15 g TEAF (17.0 mmol) resulted in the following gel composition:

1 $SiO_2$/0.05 APTMS/0.57 TEAF/7 $H_2O$

The product was recovered after 19 days of heating at 140° C. in the rotating autoclave. Similarly, reaction with 0.538 g of APTMS (3.0 mmol, Gelest) and 3.30 g of TEAF (3.30 g, 17.8 mmol) resulted in the following gel composition:

1 $SiO_2$/0.1 APTMS/0.59 TEAF/7 $H_2O$

The product was recovered after 146 days heating at 140° C. in a rotating autoclave.

CHTMS

The synthesis of Beta with [2-(3-cyclohexenyl)ethyl] trimethoxysilane ("CHTMS") was similar to that described in Example 3 except that CHTMS (0.138 g, 0.6 mmol, Gelest) was used instead of PETMS. The final product was recovered after 31 days of heating at 140° C. in the rotating autoclave.

ALTMS

The synthesis of Beta with allyltrimethoxysilane ("ALTMS") was similar to that described in Example 2 except that ALTMS (0.097 g, 0.6 mmol, Gelest) was used instead of a PETMS. The final product was recovered after 12 days of heating at 140° C. in the rotating autoclave.

BPTMS

The synthesis of Beta with 3-bromopropyltrimethoxysilane ("BPTMS") was similar to that described in Example 2 except that BPTMS (0.146 g, 0.6 mmol, Gelest) was used instead of a PETMS. The final product was recovered after 16 days of heating at 140° C. in the rotating autoclave.

IPTMS

The synthesis of Beta with 3-iodopropyltrimethoxysilane ("IPTMS") was similar to that described in Example 2 except that IPTMS (0.174 g, 0.6 mmol, Gelest) was used instead of a PETMS. The final product was recovered after 15 days of heating at 140° C. in the rotating autoclave.

CETMS

The synthesis of Beta with 2-cyanoethyltrimethoxysilane ("CETMS") was similar to that described in Example 2 except that CETMS (0.105 g, 0.6 mmol, Gelest) was used instead of a PETMS. The final product was recovered after 15 days of heating at 140° C. in the rotating autoclave.

MPTMS

The synthesis of Beta with 3-mercaptopropyltrimethoxysilane ("MPTMS") was similar to that described in Example 2 except that MPTMS (0.139 g, 0.6 mmol, Gelest) was used instead of a PETMS. The final product was recovered after 47 days of heating at 140° C.

CSPTMS

The synthesis of Beta with 2-(4-chlorosulfonylphenyl) ethyltrimethoxysilane ("CSPTMS") was similar to that described in Example 2 except that CSPTMS (0.390 g, 0.6 mmol, 50% in methylenechoride, Gelest) was used instead of a PETMS. The final product was recovered after 47 days of heating at 140° C.

PyTMS

The synthesis of Beta with 2-(trimethoxysilylethyl) pyridine ("PyTMS") was similar to that described in Example 2 except that PyTMS (0.136 g, 0.6 mmol, Gelest) was used instead of a PETMS. The final product was recovered after 79 days of heating at 140° C.

DMAPTMS

The synthesis of Beta with (N,N-dimethylaminopropyltrimethoxysilane ("DMAPTMS") was similar to that described in Example 2 except that DMAPTMS (0.124 g, 0.6 mmol, Gelest) was used instead of a PETMS. The final product was recovered after 21 days of heating at 140° C.

TMAPTMS

The synthesis of Beta with N-trimethoxysilylpropyl-N,N,N-trimethylammonium chloride ("TMAPTMS") was similar to that described in Example 2 except that TMAPTMS (0.309 g, 0.6 mmol, 50% in methanol, Gelest) was used instead of a PETMS. The final product was recovered after 25 days of heating at 140° C.

PETMS (w/immediate seeding)

The synthesis was similar to that described by Example 2 except that 50 mg of Beta seed crystals were added to the mixture after adding the TEAF solution. The final product was recovered after 7 days of heating at 140° C.

Both seeding and increasing the temperature decreased the time required to obtain Beta crystals. At 150° C., seeding decreased the crystallization time from 6 days to 4 days. At 160° C. seeding decreased the crystallization time from 5 days to 3 days. At 170° C., seeding decreased the crystallization time from 3 days to 2 days.

PETMS (w/delayed seeding)

PETMS (0.38 g, 1.68 mmol, Gelest) was added to a 100 ml flask containing TEOS (14.34 g, 69 mmol, 98% Aldrich) and a stir bar. A solution of TEAF (6.80 g, 45 mmol) in water (8.10 ml) was added by pipette while stirring. The solution was stirred overnight resulting in a white slurry. At this point, 50 mg Beta seed crystals were added and the mixture was stirred for an additional 12 hours. The byproducts of the reaction, ethanol and excess water, were removed by evaporation at 50° C. to yield a wet solid. Water was added to the solid as necessary to adjust the water content to the following gel composition:

1 $SiO_2$/0.025 PETMS/0.55 TEAF/7.25 $H_2O$

The gel was transferred to Teflon lined rotating autoclave (approximately 60 rpm) and heated at 140° C. After 10.5 days, the product was recovered by filtration, washed with water and acetone, and dried at room temperature.

PETMS & Al

The synthesis of Beta with PETMS & aluminum was similar to that described by Example 2 except that 0.225 g of aluminum nitrate nonhydrate (0.6 mmol, Baker) was also dissolved in the TEAF/water solution. Ratio of PETMS:Si:Al=0.02:1:0.02. The final product was recovered after 30 days of heating at 150° C. in a rotating autoclave. Seeding the solution with Beta seed crystals substantially decreased crystallization times. At 150° C., seeding reduced the time to 6 days. At 160° C., seeding decreased the time to 4 days, and at 170° C. seeding decreased the time to 3 days.

PETMS & B

The synthesis of Beta with PETMS & boron was similar to that described by Example 2 except that 37 mg of boric acid (0.6 mmol, Baker) was also dissolved in the TEAF/water solution, and the reaction mixture was seeded with Beta seed crystals. Ratio of PETMS:Si:B=0.02:1:0.02. The product was recovered after 17 days of heating at 150° C. Crystallization time was reduced to 6 days by increasing the heating temperature to 160° C.

BEBTMS

Bisethylbenzenetrimethoxysilane ("BEBTMS") (0.16 g, 0.43 mmol, Gelest) (also known as 1,4-bis(trimethoxylsilylethyl)benzene) was added to the 100 ml flask containing TEOS (4.67 g, 22.4 mmol, 98% Aldrich) and a stir bar. A solution of TEAF (2.22 g, 15 mmol) in water (3.85 ml) was added by pipette while stirring. The solution was stirred overnight resulting a white slurry. The byproducts of the reaction, ethanol and excess water, were removed by evaporation at 50° C. to yield a wet solid. Water was added to the solid as necessary to adjust the water content to the following gel composition:

1 $SiO_2$/0.02 BEBTMS/0.55 TEAF/7.25 $H_2O$.

The gel was transferred to a Teflon lined rotating autoclave (approximately 60 rpm) and heated to 140° C. After 23 days, the product was recovered by filtration, washed with water and acetone, and dried at room temperature. The product had the characteristic x-ray diffraction pattern for Beta (BEA structure type).

PETMS and MTMS

PETMS (0.39 g, 1.7 mmol, Gelest) and methyltrimethoxylsilane ("MTMS") (0.24 g, 1.75 mmol, Gelest) were added to the 100 ml flask containing TEOS (14.45 g, 68 mmol, 98% Aldrich) and a stir bar. A solution of TEAF (6.9 g, 37.5 mmol) in water (7.5 ml) was added by pipette while stirring. The solution was stirred overnight resulting a white slurry. The byproducts of the reaction, ethanol and excess water, were removed by evaporation at 50° C. to yield a wet solid. Water was added to the solid as necessary to adjust the water content to the following gel composition:

1 $SiO_2$/0.025 PETMS/0.025 MTMS/0.55 TEAF/7.25 $H_2O$.

The gel was transferred to a Teflon lined rotating autoclave (approximately 60 rpm) and heated to 140° C. After 42 days, the product was recovered by filtration, washed with water and acetone, and dried at room temperature. The product had the characteristic x-ray diffraction pattern for Beta (BEA structure type).

EXAMPLE 5

Synthesis of ZSM-5 (MFI structure type)

An SDA solution ("HMDA•2$HF_{aq}$") was made by mixing an aqueous solution of hexamethylenediamine ("HMDA") (117.8 g, 70% Aldrich) with 240 ml water. While stirring the mixture, hydrofluoric acid (about 90 g, 48% Mallinckrodt) was added dropwise very slowly until the pH became neutral.

The final pH was 7.15 and the concentration was 2.142 mmol HMDA/g-solution, respectively.

The SDA solution (14.01 g, 30 mmol) was added by pipette to a 100 ml flask containing tetraethylorthosilicate ("TEOS") (6.38 g, 30 mmol, 98% Aldrich). The mixture was stirred overnight resulting in a white slurry. The byproducts of the reaction, ethanol and excess water, were removed by evaporation at 50° C. to yield a wet solid. Water was added as necessary to adjust the water content. The final gel composition was as follows:

1 $SiO_2$/1HMDA•2 HF/10 $H_2O$

The gel was transferred to a Teflon lined rotating autoclave (approximately 60 rpm) and heated to 135° C. After 43 days, the product was recovered by filtration, washed with water and acetone, and dried at room temperature. The product had the characteristic x-ray diffraction pattern for ZSM-5 (MFI structure type).

PETMS

The synthesis of ZSM-5 with phenethyltrimethoxysilane ("PETMS") was similar to that described above for ZSM-5 except that PETMS (0.204 g, 0.9 mmol, Gelest) was also added to the 100 ml flask which contained TEOS (6.38 g, 30 mmol, 98% Aldrich). The final gel composition was as follows:

1 $SiO_2$/0.03 PETMS/1 HMDA•2 HF/10 $H_2O$.

The final product was recovered after 24 days of heating at 135° C. and displayed the characteristic x-ray diffraction pattern for ZSM-5 (MFI structure type).

APTMS

The synthesis of ZSM-5 with 3-aminopropyltrimethoxysilane ("APTMS") was similar to that described for ZSM-5 except that APTMS (0.161 g, 0.9 mmol, Gelest) was also added to the 100 ml flask which contained TEOS (6.38 g, 30 mmol, 98% Aldrich). The final product was recovered after 44 days heating of heating at 135° C. and displayed the characteristic x-ray diffraction pattern for ZSM-5 (MFI structure type).

EXAMPLE 6

Synthesis of NaY (FAU structure type) with CHE (w/o SDA)

Zeolite Y (faujasite) synthesized in the presence of sodium cation is sometimes referred to as NaY to designate the cation used during synthesis. 1.07 g of sodium aluminate (Pfaltz & Bauer) was dissolved in 7 g water and 1.4 g 50% NaOH/water solution (EM Science). This mixture was stirred for 15 minutes. In a separate flask, 7 g of a colloidal silica/water solution (Ludox HS-30) was mixed with 1.6 g water and 0.40 g [2-(3-cyclohexenyl)ethyl]trimethoxysilane ("CHE", Gelest, 1.7 mmol) and stirred. After 1 hour, this silica solution is added dropwise to the sodium aluminate solution. This mixture thickens and the gel is allowed to stir for 18 hours. After 18 hours, the gel is aged statically at room temperature for 24 hours. The final gel composition was as follows:

0.93 $SiO_2$/0.05 CHE/0.86 Na/22.6 $H_2O$/0.36 Al

The gel is then transferred to a teflon-lined autoclave and heated statically in an oven at 110° C. After 1 day, the product was recovered by filtration and washed with water and acetone and dried at room temperature. The final product displayed the characteristic x-ray diffraction pattern of FAU (Y) structure.

Synthesis of NaY with other organosilanes (w/o SDA)

Faujasite containing the other organosilanes were synthesized in a similar manner to the just described protocol by replacing CHE with 1.17 mmol of the specific organosilane (obtained from Gelest):

i) 7-octenyltrimethoxysilane ("OCTE") (0.40 g);
ii) hexyltrimethoxysilane ("HEXA") (0.36 g);
iii) [2-(3-cyclohexenyl)ethyl]trichlorosilane ("CHECl") (0.42 g);
iv) octyltriethoxysilane ("OCTY") (0.48 g);

v) bromoundecyltrimethoxysilane ("BrUnd") (0.62 g); and,
vi) 1,4-bis(trimethoxysilylethyl)benzene ("BEB") (0.65 g);

Synthesis of NaY with PETMS (using 15-Crown-5 as the SDA)

0.60 g of sodium aluminate (Pfaltz & Bauer) and 0.77 g 15-crown-5 ether (Aldrich, 3.5 mmole) were dissolved in 3.5 g water and 0.785 g 50% NaOH/water solution (EM Science). This mixture was stirred for 15 minutes. To this solution, 0.24 g PETMS (1 mmol) were added dropwise. This solution was allowed to stir for 2 hours. Next, 7 g of a colloidal silica/water solution (Ludox HS-30) was added dropwise. This solution was stirred for 24 hours at room temperature. The final gel composition was as follows:

1 $SiO_2$/0.03 PETMS/0.48 Na/14 $H_2O$/0.2 Al/0.1 15-crown-5

The gel is then transferred to a teflon-lined autoclave and heated statically in an oven at 110° C. After 12 days, the product was recovered by filtration and washed with water and acetone and dried at room temperature. The product had the characteristic x-ray diffraction pattern of FAU (Y) structure.

EXAMPLE 7

Extraction of SDA from Pure Beta

The pure-silica Beta (0.1 g) (obtained as described in Example 1). The crystals of Beta were added to a mixture of pyridine (8 ml) and water (12 ml), placed in a Teflon lined autoclave, and heated (with rotation (about 60 rpm)) to 140° C. After a day, the solid was recovered by filtration, washed with water and acetone, and dried at 100° C. This procedure was effective to remove approximately 80% of the TEAF with almost no loss in crystalinity when compared with the as synthesized pure-silica Beta.

In addition to the mixture of pyridine and water, other combinations that were effective to remove TEAF from Beta (using the just described protocol) include:
i) a mixture of acetic acid (3 ml) and water (17 ml) resulting in 85% TEAF extraction;
ii) a mixture of acetic acid (3 ml), pyridine (2 ml) and water (15 ml) resulting in 85% TEAF extraction;
iii) a mixture of methanol (10 ml) and water (10 ml) resulting in 55% TEAF extraction;
iv) a mixture of acetonitrile (8 ml) and water (12 ml) resulting in 57% TEAF extraction.

Increasing the heating temperature from 140° C. to higher temperatures generally increased the efficiency of the extraction. By adjusting the temperature, the time in the autoclave, or increasing the number of times the extraction procedure was repeated, a greater than 99% extraction of TEAF (as measured by thermogravimetric analysis) was routinely possible using a variety of extractants. For example, repeating the extraction four times using a mixture of pyridine (8 ml) and water (12 ml) at heating the sample to 135° C. for one day resulted in a 100% extraction from the pure Beta material.

Extraction of SDA from Functionalized Beta

TEAF was removed from functionalized Beta in a similar manner. Briefly, extraction was performed using a mixture of acetic acid (3 ml), pyridine (2 ml) and water (15 ml) and heating at 140° C. for one day. The extraction procedure was repeated twice and the resulting solids were analyzed by thermogravimetric analysis. Functional groups incorporated into the framework may be differentiated from TEAF because they usually burn off at a temperature (300–500° C.) higher than that for TEAF (300–380° C.). Table 2 illustrates some exemplary data regarding the efficiency of TEAF extraction and the incorporation of the functional group into the framework structure for various functionalized Betas.

TABLE 2

| Functional Group (R) | % TEAF Extraction | Presence of R confirmed |
| --- | --- | --- |
| phenethyl | 90 | yes |
| allyl | 95 | yes |
| iodopropyl | 100 | yes |
| mercoptopropyl | 88 | yes |
| chlorosulfonylphenyl | 85 | yes |

Extraction of SDA from other functionalized zeolites (i.e. ZSM-5) were performed analogously.

Soxlet Extraction

An alternate protocol for SDA removal is Soxlet extraction. Using PETMS-functionalized Beta as an example, 0.80 g of the functionalized material is placed in a soxlet extraction thimble (19 mm×90 mm, Whatman). The loaded thimble is placed in the soxlet extractor and a 500 ml round bottom flask containing 350 ml of a pyridine/water mixture (350 ml total volume: 55% pyridine, 45% water) is attached. The solvent is refluxed vigorously for 7 days. The extracted product is recovered by filtration and washed with excess water and acetone. The procedure resulted in a 90% removal of the TEAF from the PETMS-functionalized Beta (as determined by TGA).

EXAMPLE 8

Removal of External Functionalities

Any functionalities on the external surfaces of the molecular sieves may be removed by reacting the as-synthesized material with concentrated sodium hydroxide solutions. In a typical procedure, 0.2 g of the as-made functionalized molecular sieve (i.e. Beta w/PETMS) is added to 15 ml of a 8.33 M NaOH solution in a 20 ml glass vial. 1 g of methanol and a magnetic stir bar are then added. The vile is capped and the slurry is stirred at room temperature for 1 hour. The solid is recovered by filtration and washed with an acetic acid solution (10 wt % acetic acid in water). The solid is then dried at room temperature. However, this protocol may be unnecessary since sulfonation of the as-made material did not yield any surface acid sites that were detectable either by spectroscopic means or catalysis.

EXAMPLE 9

Sulfonation

The following sulfonation procedure may be used with any form of the molecular sieve (i.e., as-made, extracted). 0.25 g of the molecular sieve is added to the sample chamber having two stopcocks and connectable to an oleum chamber. The sample is allowed to dehydrate dehydrated overnight at 100° C. After dehydration, the stopcocks are closed and 2 ml of 30% oleum (30% $SO_3$ in $H_2SO_4$, Aldrich) is added to the oleum chamber. The oleum is then degassed with liquid-nitrogen ("$LN_2$") freeze/thaw/vacuum cycles (4×). Next, the oleum chamber is immersed in $LN_2$, the left stopcock is opened and the entire chamber is placed under a vacuum for 15 minutes. With the center stopcock closed, the oleum is allowed to warm to room temperature. The sample is sulfonated for 24 hours by $SO_3$ vapor traveling from the oleum chamber to the sample chamber via a connecting arm. After the allotted time, the oleum chamber is again immersed in $LN_2$ for 15 minutes. While maintaining the oleum chamber in $LN_2$, the center stopcock is opened and the system is placed under vacuum for 20 minutes. The product is removed from the sample chamber and washed liberally with various solvents including water, acetone, pentane, and dioxane. Typically, the total volume of solvent used is approximately between 250 and 300 ml.

EXAMPLE 10

Active Site Density 0.21 g of Beta/PETMS/$SO_3$H were washed with 15 ml of saturated NaCl solution at room temperature. The functionalized molecular sieve was removed by filtration. Several drops of phenolphthalein solution were added to the filtrate and then this solution was titrated with 0.001 M NaOH to neutrality. The active site density obtained from this method agreed well with the total mass of organic material as determined by thermogravimetric analysis, and elemental analysis for sulfur.

Catalysis by Beta/PETMS/$SO_3$H 0.98 g of cyclohexanone (10 mmole, Aldrich) was dissolved in 9 g toluene (Aldrich, anhydrous) in a 20 ml glass reactor with a stirbar. 10 mg of dehydrated molecular sieve catalyst (12 hours at ~100° C.) was added to the solution. 0.62 g ethylene glycol (10 mmole, anhydrous, Aldrich) was then added and the reaction mixture was immediately placed in an oil bath at 70° C. with magnetic stirring. Samples were taken periodically and analyzed by GC/MS. For catalytic reactions involving 1-pyrenecarboxaldehyde ("PYC"), 3 mmol of PYC replaced the cyclohexanone in the just described protocol.

EXAMPLE 11

General Protocol for Base Catalysis

The ability of the inventive molecular sieves to facilitate base catalyzed reactions was illustrated using the reaction of benzaldehyde and malononitrile to benzylidenemalononitrile and water. In general, an aminopropyl-functionalized molecular sieve functioned as the base. Briefly, malononitrile (0.40 g, 6 mmol) and benzaldehyde (0.642 g, 6 m mol) were dissolved in 40 ml toluene. 2 ml of this solution was transferred to 5 ml glass reactor with a stir bar. 20 mg of dehydrated molecular sieve catalyst was added to the solution and the reaction mixture was immediately placed in an oil bath at 50° C. with magnetic stirring. Samples were taken periodically and analyzed by GC/MS.

Aminopropyl-functionalized Beta

Aminopropyl-functionalized Beta was synthesized in a similar manner to that described by Example 4 (Beta w/APTMS). However, the amount of APTMS used was 0.161 g (0.9 mmol, Gelest) and the amount of TEAF was 3.09 g TEAF (16.7 mmol) to produce the following gel composition:

1 $SiO_2$/0.03 APTMS/0.56 TEAF/7 $H_2O$

The product was recovered after 18 days of heating at 140° C. in the rotating autoclave. The functionalized material was extracted with the mixture of pyridine and water at 140° C. and then dehydrated under vacuum at about 190° C. The resulting aminopropyl-functionalized Beta was used as the base to catalyze the reaction. Approximately 50% of malononitrile was converted to benzylidenmalononitrile in about 3 hours. Product selectivity for the benzylidenemalononitrile was almost 100%.

In a similar experiment, the reaction was carried out as descrobed above but stopped after 30 minutes. The molecular sieve was filtered and only the filtrate was returned to the oil bath. The reaction was monitored for another 24 hours. However, the amount of benzylidenemalononitrile did not increase any further beyond what was detected when the molecular sieves were removed from the reaction mixture. This result strongly suggests that it is the functionalized molecular sieve and not a component of the filtrate that is acting as the catalyst for the reaction.

Aminopropyl-functionalyzed ZSM-5

Aminopropyl-functionalized ZSM-5 was synthesized in a similar manner to that described by Example 5 (ZSM-5 w/APTMS). The functionalized material was extracted with the mixture of pyridine and methanol at 140° C. and then dehydrated under vacuum at about 190° C. The resulting aminopropyl-functionalized ZSM-5 was used as the base to catalyze the reaction. Approximately 75% of malononitrile was converted to benzylidenmalononitrile in about 3 hours. Product selectivity for the benzylidenemalononitrile was almost 100%.

Unfunctionalized Beta

Molecular sieve Beta (unfunctionalized) was synthesized using the protocol described by Example 1 and used as a control for the base catalyzed experiment. As with the functionalized Beta and ZSM-5, Beta was extracted with the mixture of pyridine and water at 140° C. and then dehydrated under vacuum at about 190° C. The resulting material was used in an analogous manner as the above described aminopropyl-functionalized materials. However, unlike the aminopropyl-functionalized Beta and ZSM-5 materials, conversion of malonitrile was negligible with no detectable amount of benzylidenemalononitrile was present even after 4 hours.

Although the present invention has been described with reference to preferred embodiments, it will be appreciated that these embodiments are for purposes of illustration only and are not intended to limit the scope of the appended claims.

What is claimed is:

1. A molecular sieve comprising a crystalline framework and micropores of substantially uniform size and shape formed therein, wherein the size of the micropore is less than or equal to 15 Å and wherein the framework includes one or more monomers that are covalently bonded thereto and substantially evenly distributed therein, the monomer having the general formula

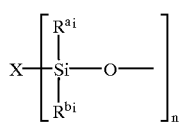

wherein:
n is an integer from 1 to 5;
X is a substituted or unsubstituted moiety; and $R^{ai}$ and $R^{bi}$ for i=1 to i=n are each independently either oxygen, or a substituted or unsubstituted moiety, wherein the moiety is selected from the group consisting of $C_1$–$C_{20}$ alkyl, $C_2$–$C_{20}$ alkenyl, $C_2$–$C_{20}$ alkynyl, cycloalkyl, cycloalkenyl, aryl, and heteroaryl, each optionally substituted with one or more substituents selected from the group consisting of $C_1$–$C_5$ alkyl, $C_2$–$C_5$ alkenyl, $C_2$–$C_5$ alkynyl, cycloalkyl, cycloalkenyl, aryl, and heteroaryl, and a functional group selected from the group consisting of alcohol, sulfonic acid, phosphine, thiol, thioether, ketone, aldehyde, ester, ether, amine, imine, amide, imide, imido, nitro, carboxylic acid, disulfide, carbonate, isocyanate, carbodiimide, carboalkoxy, carbamate, acetal, ketal, boronate, cyano, cyanohydrin, hydrazine, oxime, hydrazide, enamine, sulfone, sulfide, sulfenyl, and halogen.

2. The molecular sieve as in claim 1 wherein n is 2 and the monomer is of the formula:

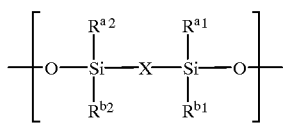

3. The molecular sieve as in claim 1 wherein n is 1 and the monomer is of the formula:

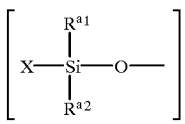

4. A molecular sieve comprising a crystalline framework and a plurality of micropores wherein the size of the micropore is less than or equal to 15 Å and wherein at least a portion of the micropores includes one or more monomers that are substantially evenly dispersed therein and covalently bound to the framework, the monomer having the general formula:

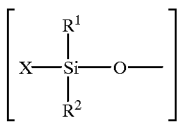

wherein:

X is a substituted or unsubstituted moiety and $R^1$ and $R^2$ are each independently either oxygen, or a substituted or unsubstituted moiety, wherein the moiety is selected from the group consisting of $C_1$–$C_{20}$ alkyl, $C_2$–$C_{10}$ alkenyl, $C_2$–$C_{20}$ alkynyl, cycloalkyl, cycloalkenyl, aryl, and heteroaryl, each optionally substituted with one or more substituents selected from the group consisting of $C_1$–$C_5$ alkyl, $C_2$–$C_5$ alkenyl, $C_2$–$C_5$ alkynyl, cycloalkyl, cycloalkenyl, aryl, heteroaryl, and a functional group selected from the group consisting of alcohol, sulfonic acid, phosphine, thiol, thioether, ketone, aldehyde, ester, ether, amine, imine, amide, imide, imido, nitro, carboxylic acid, disulfide, carbonate, isocyanate, carbodiimide, carboalkoxy, carbamate, acetal, ketal, boronate, cyano, cyanohydrin, hydrazine, oxime, hydrazide, enamine, sulfone, sulfide, sulfenyl, and halogen.

5. The molecular sieve as in claim 4 wherein $R^1$ and $R^2$ are both oxygen.

6. The molecular sieve as in claim 5 wherein X is —$(CH_2)_m$Z wherein m is from 1 to 10 and Z is selected from the group consisting of cycloalkenyl, aryl, heteroaryl, and a functional group selected from the group consisting of alcohol, sulfonic acid, thiol, amine, amide, nitro, carboxylic acid, cyano, and halogen.

7. The molecular sieve as in claim 6 wherein Z is selected from the group consisting of cyclopentenyl, cyclohexenyl, phenyl, naphthyl, pyrryl, furyl, thienyl, pyridyl, quinolyl, and isoquinolyl.

8. The molecular sieve as in claim 7 wherein Z includes one or more functional groups selected from the group consisting of alcohol, sulfonic acid, thiol, amine, amide, nitro, carboxylic acid, cyano and halogen.

9. The molecular sieve as in claim 6 wherein n is from 1 to 5 and Z is phenyl, wherein the phenyl optionally includes one or more functional groups selected from the group consisting of sulfonic acid, nitro, amine, amide, and halogen.

10. The molecular sieve as in claim 5 wherein the one or more monomers forms a coordination complex with a metal or a metal-containing ion.

11. The molecular sieve as in claim 4 wherein the molecular sieve has a structure type is selected from the group consisting of BEA, FAU, and MFI.

12. A molecular sieve having a crystalline framework and a plurality of channels formed from the condensation of a source of silica with a compound of the formula

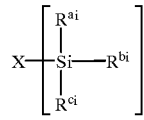

wherein:

n is an integer from 1 to 5;

X is a substituted or unsubstituted moiety; and $R^{ai}$, $R^{bi}$, and $R^{ci}$ for i=1 to i=n are each independently either a hydrolyzable group, or a substituted or unsubstituted moiety, wherein the moiety is selected from the group consisting of $C_1$–$C_{20}$ alkyl, $C_2$–$C_{20}$ alkenyl, $C_2$–$C_{20}$ alkynyl, cycloalkyl, cycloalkenyl, aryl, and heteroaryl, each optionally substituted with one or more substituents selected from the group consisting of $C_1$–$C_5$ alkyl, $C_2$–$C_5$ alkenyl, $C_2$–$C_5$ alkynyl, cycloalkyl, cycloalkenyl, aryl, and heteroaryl, and a functional group selected from the group consisting of alcohol, sulfonic acid, phosphine, thiol, thioether, ketone, aldehyde, ester, ether, amine, imine, amide, imide, imido, nitro, carboxylic acid, disulfide, carbonate, isocyanate, carbodiimide, carboalkoxy, carbamate, acetal, ketal, boronate, cyano, cyanohydrin, hydrazine, oxime, hydrazide, enamine, sulfone, sulfide, sulfenyl, and halogen, provided that at least one R in said compound is a hydrolyzable group wherein the X moiety is substantially evenly distributed throughout the framework.

13. A molecular sieve having a crystalline framework and a plurality of pores formed from the condensation of a source of silica with a compound of the formula

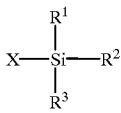

wherein:
X is a substituted or unsubstituted moiety and
R$^1$, R$^2$, and R$^3$ are each independently either any hydrolyzable group, or a substituted or unsubstituted moiety, the moiety being selected from the group consisting of C$_1$–C$_{20}$ alkyl, C$_2$–C$_{10}$ alkenyl, C$_2$–C$_{20}$ alkynyl, cycloalkyl, cycloalkenyl, aryl, and heteroaryl, provided that at least one of R$^1$, R$^2$, and R$^3$ is a hydrolyzable group
wherein the X moiety is substantially evenly distributed throughout the framework.

14. The molecular sieve as in claim 13 wherein the moiety is substituted with one or more groups selected from the group consisting of C$_1$–C$_5$ alkyl, C$_2$–C$_5$ alkenyl, C$_2$–C$_5$ alkynyl, cycloalkyl, cycloalkenyl, aryl, heteroaryl, and a functional group selected from the group consisting of alcohol, sulfonic acid, phosphine, thiol, thioether, ketone, aldehyde, ester, ether, amine, imine, amide, imide, imido, nitro, carboxylic acid, disulfide, carbonate, isocyanate, carbodiimide, carboalkoxy, carbamate, acetal, ketal, boronate, cyano, cyanohydrin, hydrazine, oxime, hydrazide, enamine, sulfone, sulfide, sulfenyl, and halogen.

15. The molecular sieve as in claim 13 wherein the hydrolyzable group is selected from the group consisting of hydrogen, C$_1$–C$_{10}$ alkoxy, aryloxy, and halide.

16. The molecular sieve as in claim 15 wherein R$^1$, R$^2$, and R$^3$ are the same and are a hydrolyzable group selected from the group consisting methoxy, ethoxy, propoxy, butoxy, and chloride.

17. The molecular sieve as in claim 16 wherein the moiety is selected from the group consisting of C$_1$–C$_{10}$ alkyl, C$_2$–C$_{10}$ alkenyl, phenyl, and benzyl.

18. The molecular sieve as in claim 16 wherein X is —(CH$_2$)$_m$Z wherein m is from 1 to 10 and Z is selected from the group consisting of halide, cycloalkenyl, aryl, and heteroaryl.

19. The molecular sieve as in claim 18 wherein Z is selected from the group consisting of cyclopentenyl, cyclohexenyl, phenyl, naphthyl, pyrryl, furyl, thienyl, pyridyl, quinolyl, and isoquinolyl.

20. The molecular sieve as in claim 19 wherein Z includes one or more functional groups selected from the group consisting of alcohol, sulfonic acid, thiol, amine, amide, nitro, carboxylic acid, and halogen.

21. The molecular sieve as in claim 16 wherein the compound is selected from the group consisting of: phenethyltrimethoxysilane; 3-aminopropyltrimethoxysilane; [2-(3-cyclohexenyl)ethyl]trimethoxysilane; 1,4-bis(trimethoxysilylethyl)benzene); 7-octenyltrimethoxysilane; hexyltrimethoxysilane; [2-(3-cyclohexenyl)ethyl]trichlorosilane; octyltriethoxylsilane; bromoundecyltrimethoxysilane; allyltrimethoxysilane; 3-bromopropyltrimethoxysilane; 3-iodopropyltrimethoxysilane; 2-cyanoethyltrimethoxysilane; 3-mercaptopropyltrimethoxysilane; 2-(4-chlorosulfonylphenyl)ethyltrimethoxysilane; 2-(trimethoxysilylethyl)pyridine; (N,N-dimethylaminopropyltrimethoxysilane; N-trimethoxysilylpropyl-N,N,N-trimethylammonium chloride; methyltrimethoxysilane; and mixtures thereof.

22. A method of making a molecular sieve having a framework and micropores formed therein comprising:
crystallizing a mixture containing a source of silica and an organosilane of the formula

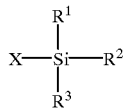

in the absence of a structure directing agent to form a crystalline product, wherein:
X is a substituted or unsubstituted moiety and
R$^1$, R$^2$, and R$^3$ are each independently either any hydrolyzable group, or a substituted or unsubstituted moiety, the moiety being selected from the group consisting of C$_1$–C$_{20}$ alkyl, C$_2$–C$_{10}$ alkenyl, C$_2$–C$_{20}$ alkynyl, cycloalkyl, cycloalkenyl, aryl, and heteroaryl, provided that at least one of R$^1$, R$^2$, and R$^3$ is a hydrolyzable group; and wherein the size of the micropore is less than or equal to 15 Å.

23. The method as in claim 22 wherein the moiety is substituted with one or more groups selected from the group consisting of C$_1$–C$_5$ alkyl; C$_2$–C$_5$ alkenyl; C$_2$–C$_5$ alkynyl; aryl; heteroaryl; and, a functional group selected from the group consisting of alcohol, sulfonic acid, phosphine, thiol, thioether, ketone, aldehyde, ester, ether, amine, imine, amide, imide, imido, nitro, carboxylic acid, disulfide, carbonate, isocyanate, carbodiimide, carboalkoxy, carbamate, acetal, ketal, boronate, cyano, cyanohydrin, hydrazine, oxime, hydrazide, enamine, sulfone, sulfide, sulfenyl, and halogen.

24. The method as in claim 23 wherein the moiety is selected from the group consisting of C$_1$–C$_{10}$ alkyl, C$_2$–C$_{10}$ alkenyl, phenyl, and benzyl.

25. The method as in claim 24 wherein R$^1$, R$^2$, and R$^3$ are the same and are a hydrolyzable group selected from the group consisting of C$_1$–C$_5$ alkoxy, aryloxy, and halide.

26. The method as in claim 25 wherein the molecular sieve has a FAU structure type.

27. The method as in claim 26 wherein the organosilane is selected from the group consisting of [2-(3-cyclohexenyl)ethyl]trimethoxysilane; 1,4-bis(trimethoxysilylethyl)benzene; 7-octenyltrimethoxysilane; hexyltrimethoxysilane; [2-(3-cyclohexenyl)ethyl]trichlorosilane; octyltriethoxysilane; bromoundecyltrimethoxysilane; and mixtures thereof.

28. A method of making a molecular sieve having a crystalline framework and micropores formed therein wherein the size of the micropore is less than or equal to 15 Å comprising:
crystallizing a mixture containing a source of silica, a structure directing agent, and an organosilane of the formula

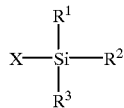

to form a crystalline product, and
extracting the structure directing agent from the crystalline framework, wherein:
X is a substituted or unsubstituted moiety and
R$^1$, R$^2$, and R$^3$ are each independently either any hydrolyzable group, or a substituted or unsubstituted moiety, the moiety being selected from the group consisting of $C_1$–$C_{20}$ alkyl, $C_2$–$C_{10}$ alkenyl, $C_2$–$C_{20}$ alkynyl, cycloalkyl, cycloalkenyl, aryl, and heteroaryl, provided that at least one of $R^1$, $R^2$, and $R^3$ is a hydrolyzable group.

29. The method as in claim 28 wherein the moiety is substituted with one or more groups selected from the group consisting of $C_1$–$C_5$ alkyl; $C_2$–$C_5$ alkenyl; $C_2$–$C_5$ alkynyl; aryl; heteroaryl; and a functional group selected from the group consisting of alcohol, sulfonic acid, phosphine, thiol, thioether, ketone, aldehyde, ester, ether, amine, imine, amide, imide, imido, nitro, carboxylic acid, disulfide, carbonate, isocyanate, carbodiimide, carboalkoxy, carbamate, acetal, ketal, boronate, cyano, cyanohydrin, hydrazine, oxime, hydrazide, enamine, sulfone, sulfide, sulfenyl, and halogen.

30. The method as in claim 29 wherein the moiety is selected from the group consisting of $C_1$–$C_{10}$ alkyl, $C_2$–$C_{10}$ alkenyl, phenyl, and benzyl.

31. The method as in claim 30 wherein $R^1$, $R^2$, and $R^3$ are the same and are a hydrolyzable group selected from the group consisting of $C_1$–$C_5$ alkoxy, aryloxy, and halide.

32. The method as in claim 31 wherein the structure directing agent is tetraethylammonium fluoride and the molecular sieve has a BEA structure type BEA.

33. The method as in claim 31 wherein the structure directing agent is hexamethylenediamine and the molecular sieve has a MFI structure type.

34. The method as in claim 31 wherein the structure directing agent is 15-Crown-5 and the molecular sieve has a FAU structure type.

35. The molecular sieve as in claim 31 wherein the organosilane is selected from the group consisting of: phenethyltrimethoxysilane; 3-5 aminopropyltrimethoxysilane; [2-(3-cyclohexenyl)ethyl]trimethoxysilane; 1,4-bis(trimethoxysilylethyl)benzene); 7-octenyltrimethoxysilane; hexyltrimethoxysilane; [2-(3-cyclohexenyl)ethyl]trichlorosilane; octyltriethoxylsilane; bromoundecyltrimethoxysilane; allyltrimethoxysilane; 3-bromopropyltrimethoxysilane; 3-iodopropyltrimethoxysilane; 2-cyanoethyltrimethoxysilane; 3-mercaptopropyltrimethoxysilane; 2-(4-chlorosulfonylphenyl)ethyltrimethoxysilane; 2-(trimethoxysilylethyl)pyridine; (N,N-dimethylaminopropyltrimethoxysilane; N-trimethoxysilylpropyl-N,N,N-trimethylammonium chloride; and mixtures thereof.

36. A method of making a functionalized molecular sieve, comprising:

(i) reacting a mixture containing a source of silica and an organosilane compound of the formula

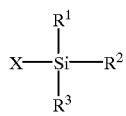

wherein $R^1$, $R^2$, and $R^3$ are the same and are a hydrolyzable group selected from the group consisting of $C_1$–$C_{10}$ alkoxy, aryloxy, and halide, and X is an organic moiety is selected from the group consisting of $C_1$–$C_{20}$ alkyl, $C_2$–$C_{10}$ alkenyl, $C_2$–$C_{20}$ alkynyl, cycloalkyl, cycloalkenyl, aryl, and heteroaryl, each optionally substituted with one or more groups selected from the group consisting of $C_1$–$C_5$ alkyl, $C_2$–$C_5$ alkenyl, $C_2$–$C_5$ alkynyl, cycloalkyl, cycloalkenyl, aryl, heteroaryl, and halide, the reaction forming a crystalline product having micropores wherein the size of the micropore is less than or equal to 15 Å and exposed organic moieties that are substantially evenly distributed contained therein; and, (ii) reacting the exposed organic moieties within said micropores to include one or more functional groups selected from the group consisting of alcohol, sulfonic acid, thiol, amine, amide, nitro, carboxylic acid, and halide.

* * * * *